Nov. 8, 1966    A. G. BODINE, JR    3,283,833
SONIC CONDUIT DRIVING SYSTEM
Filed April 20, 1965    13 Sheets-Sheet 4
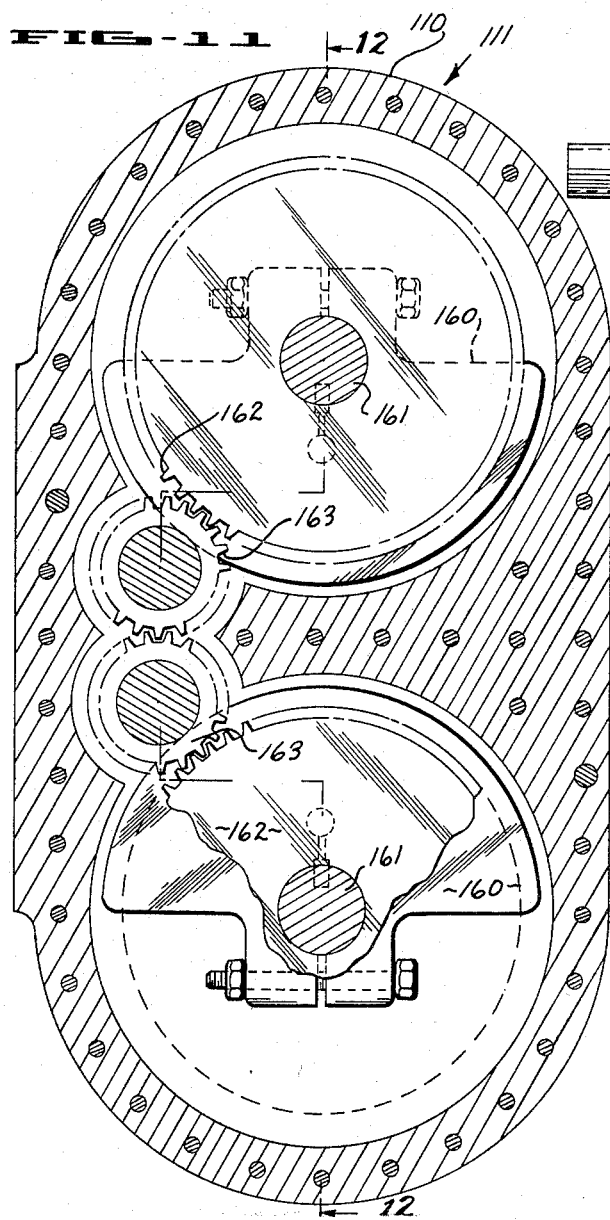
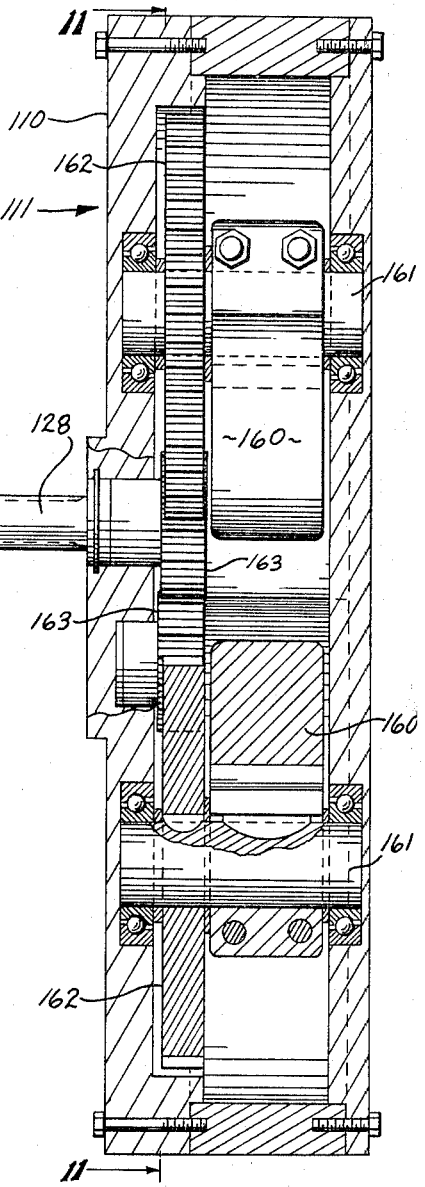
INVENTOR.
ALBERT G. BODINE, JR.
BY
ATTORNEY

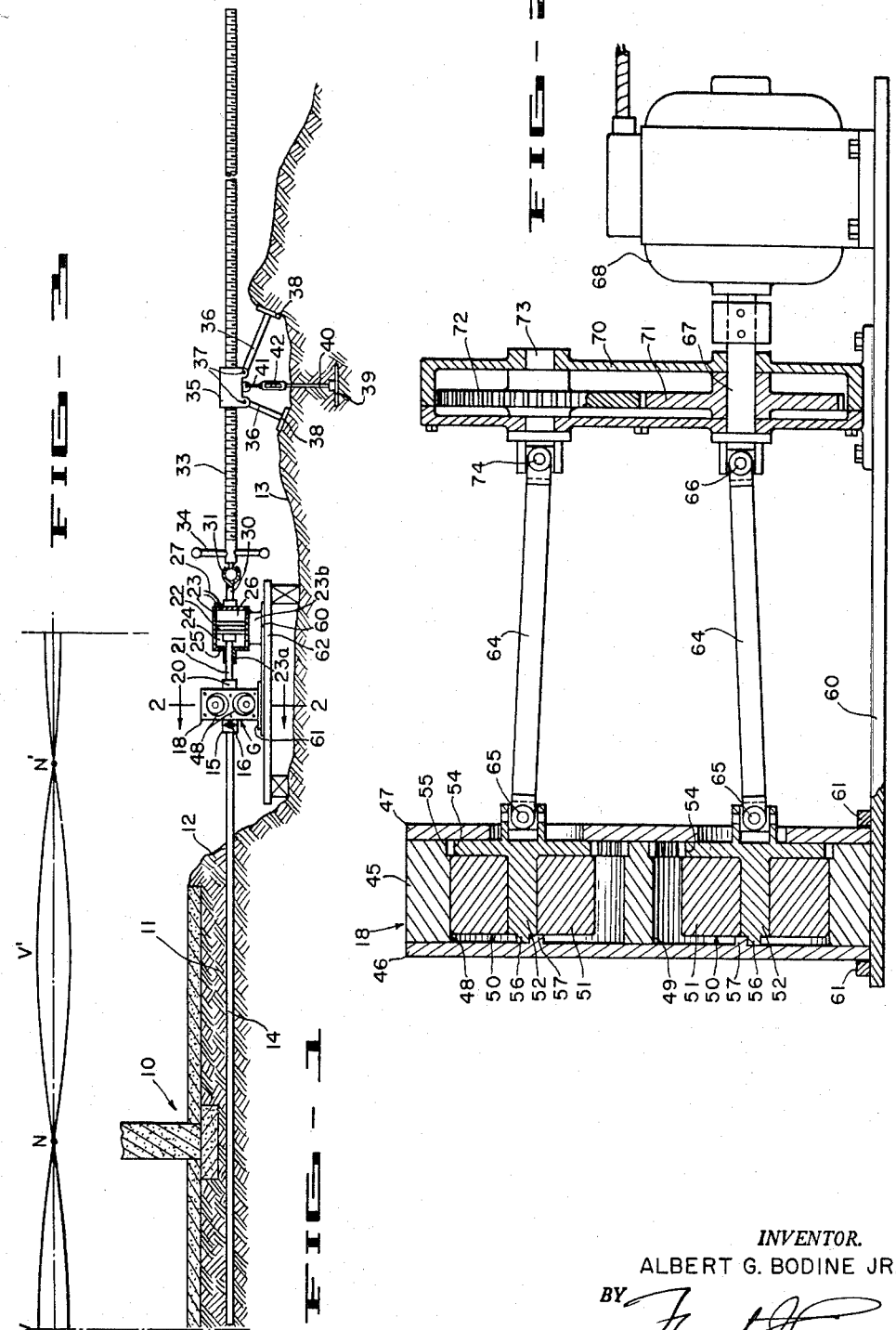

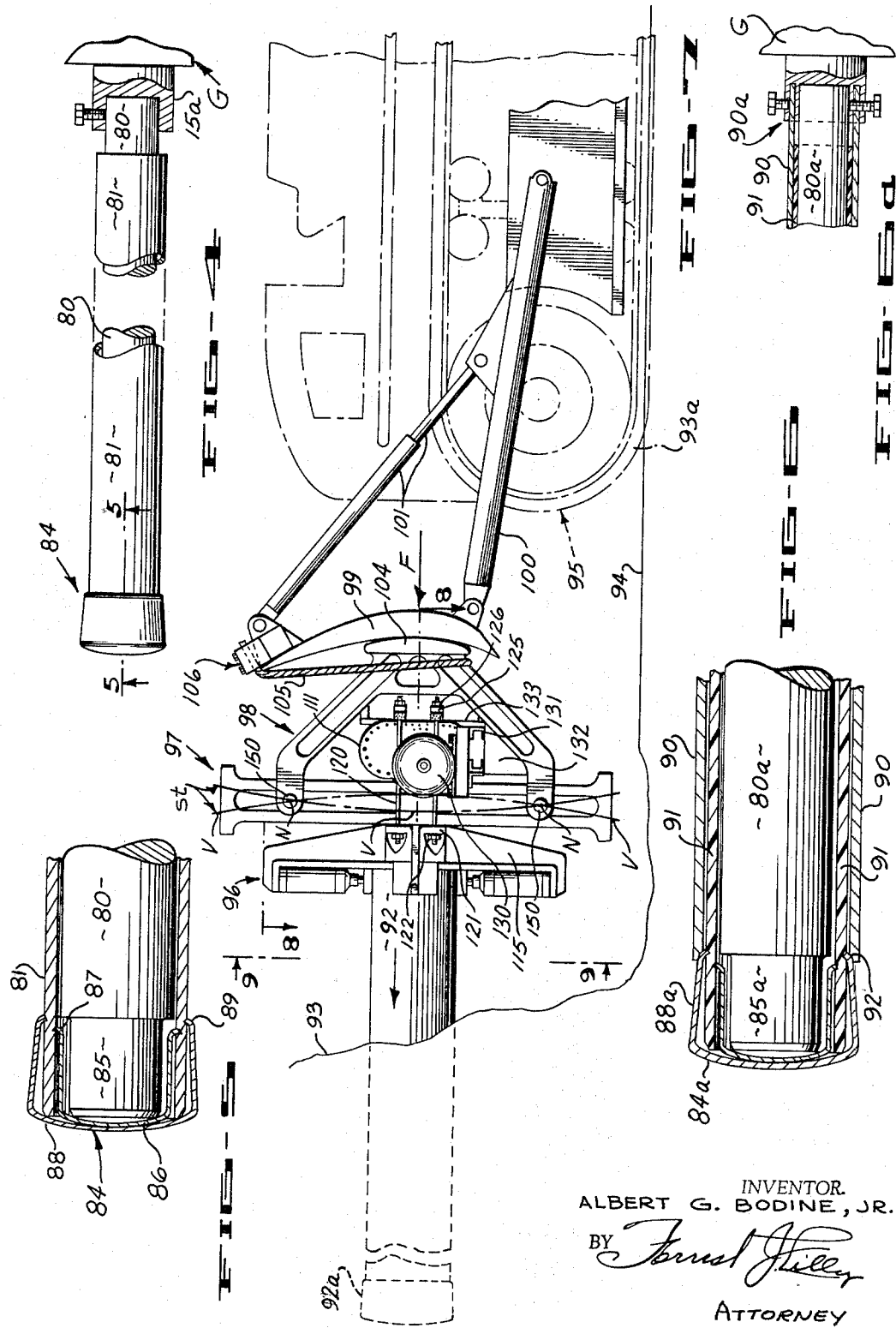

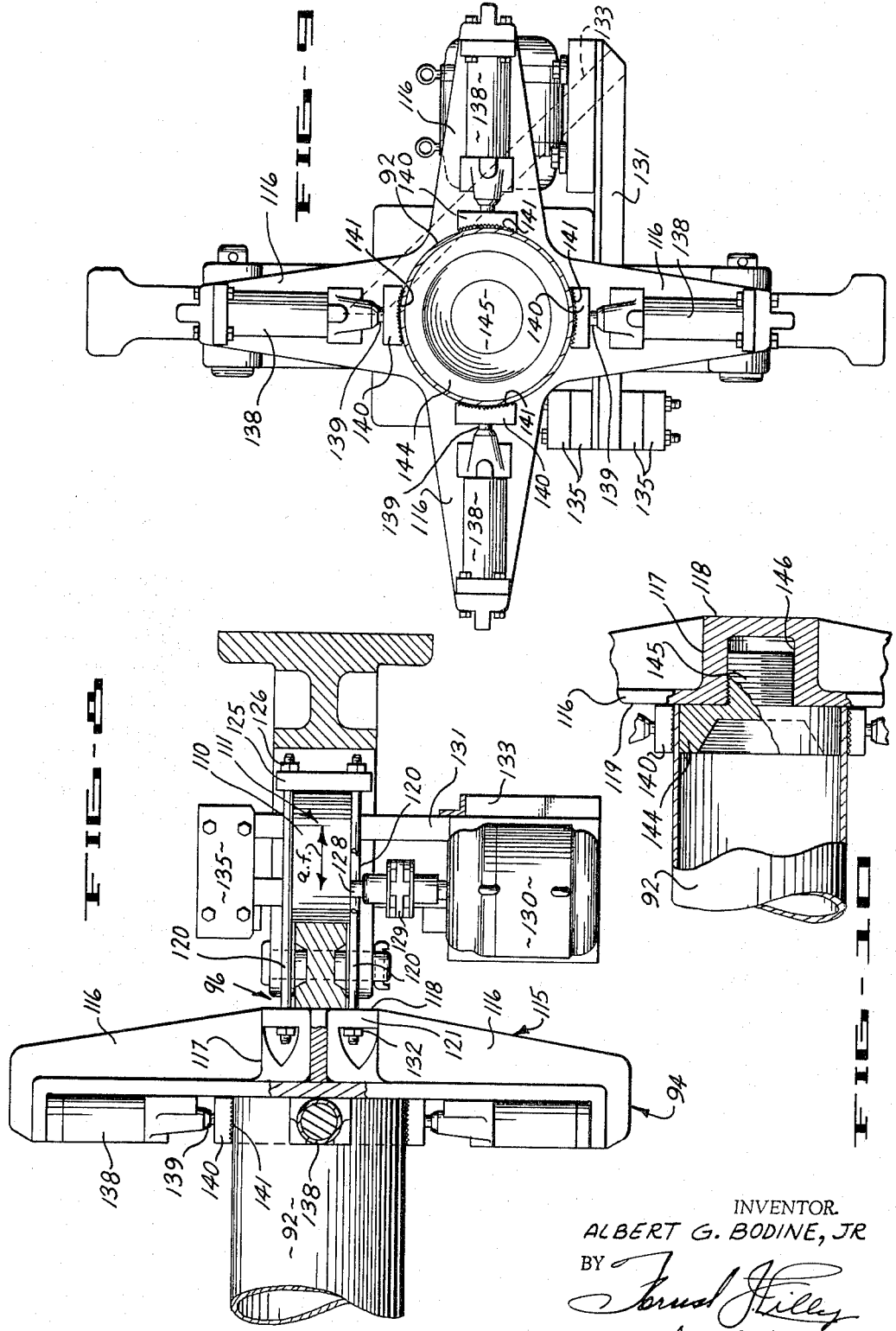

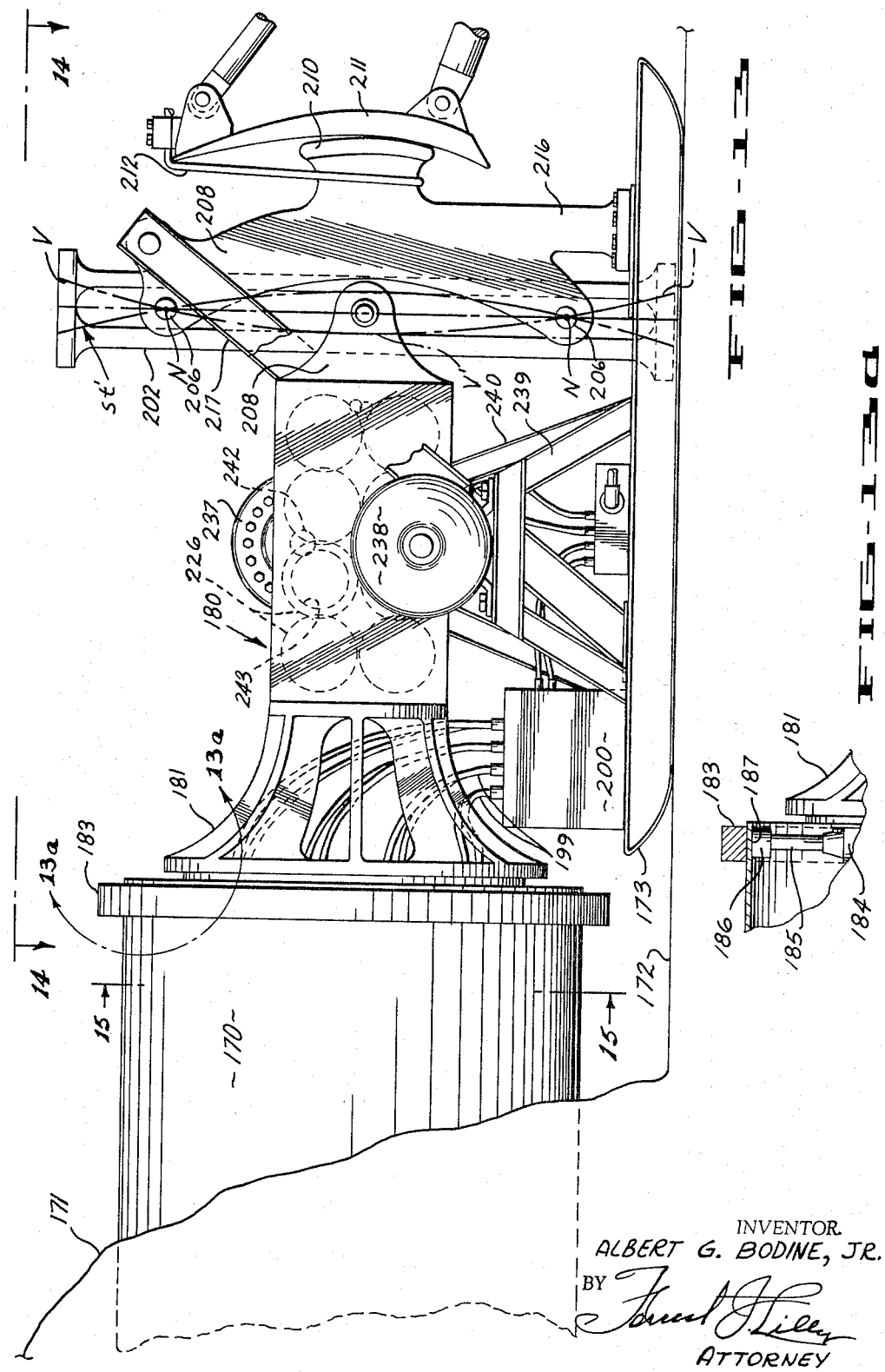

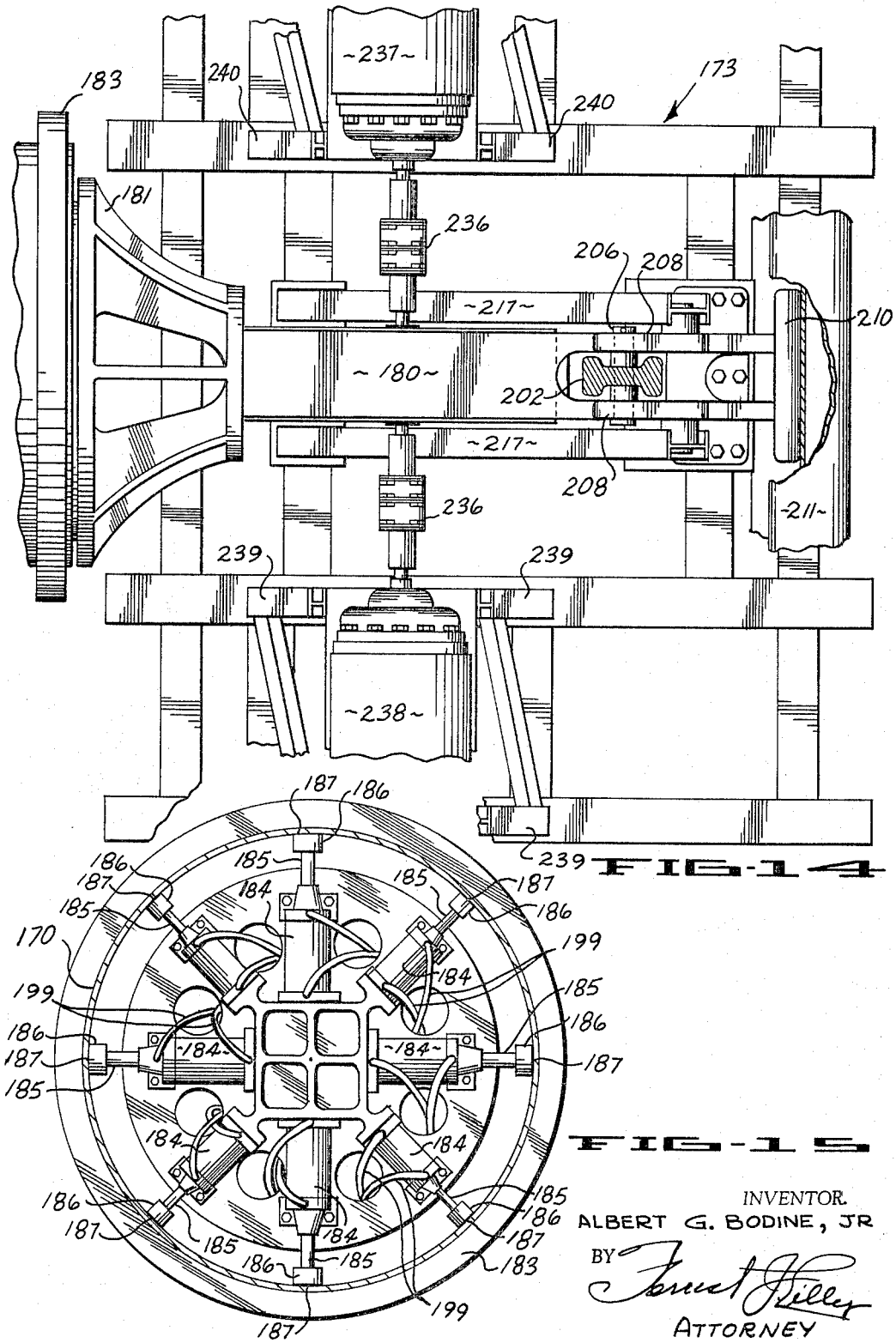

Nov. 8, 1966  A. G. BODINE, JR  3,283,833

SONIC CONDUIT DRIVING SYSTEM

Filed April 20, 1965  13 Sheets-Sheet 7

INVENTOR.
ALBERT G. BODINE, JR.
BY
ATTORNEY

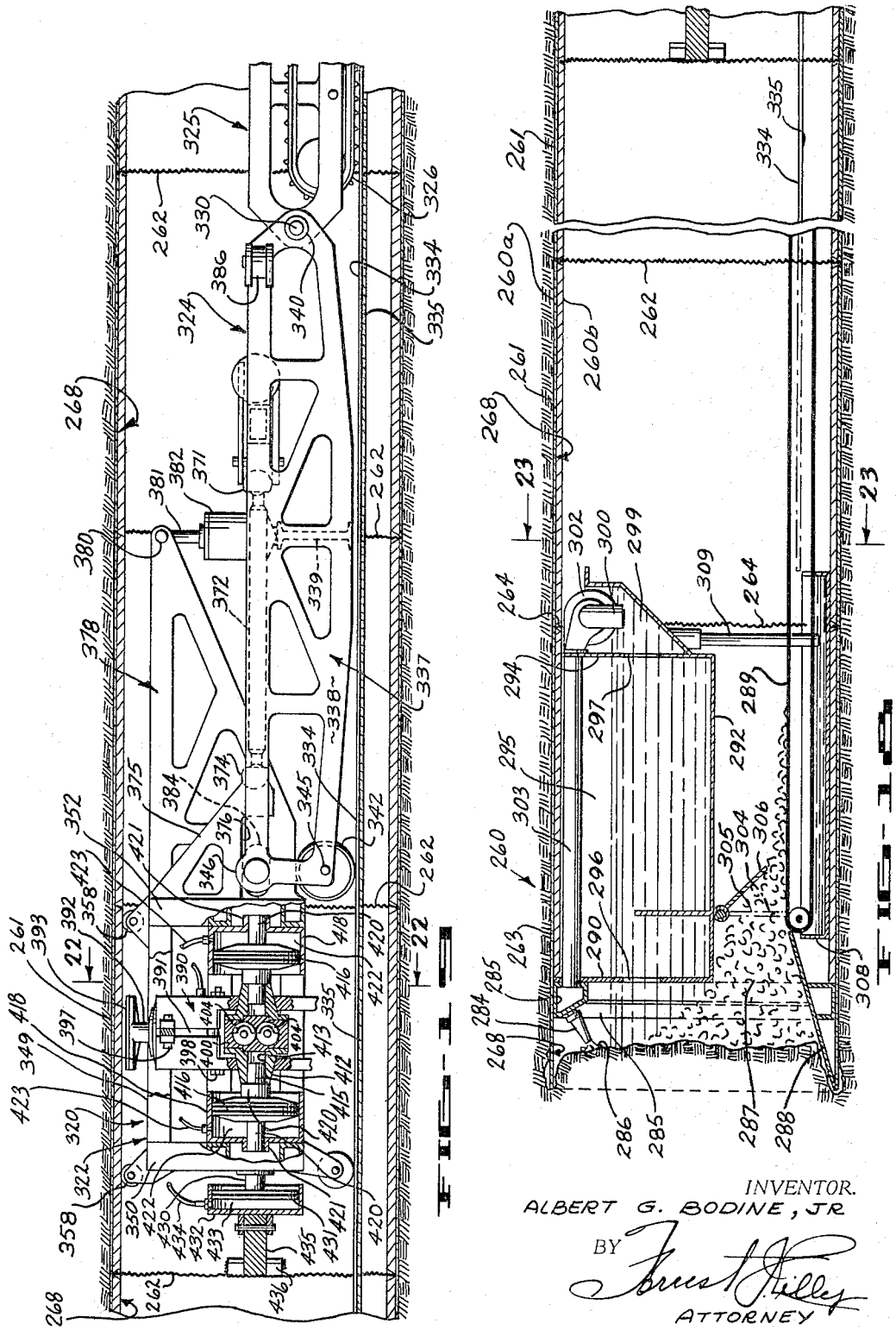

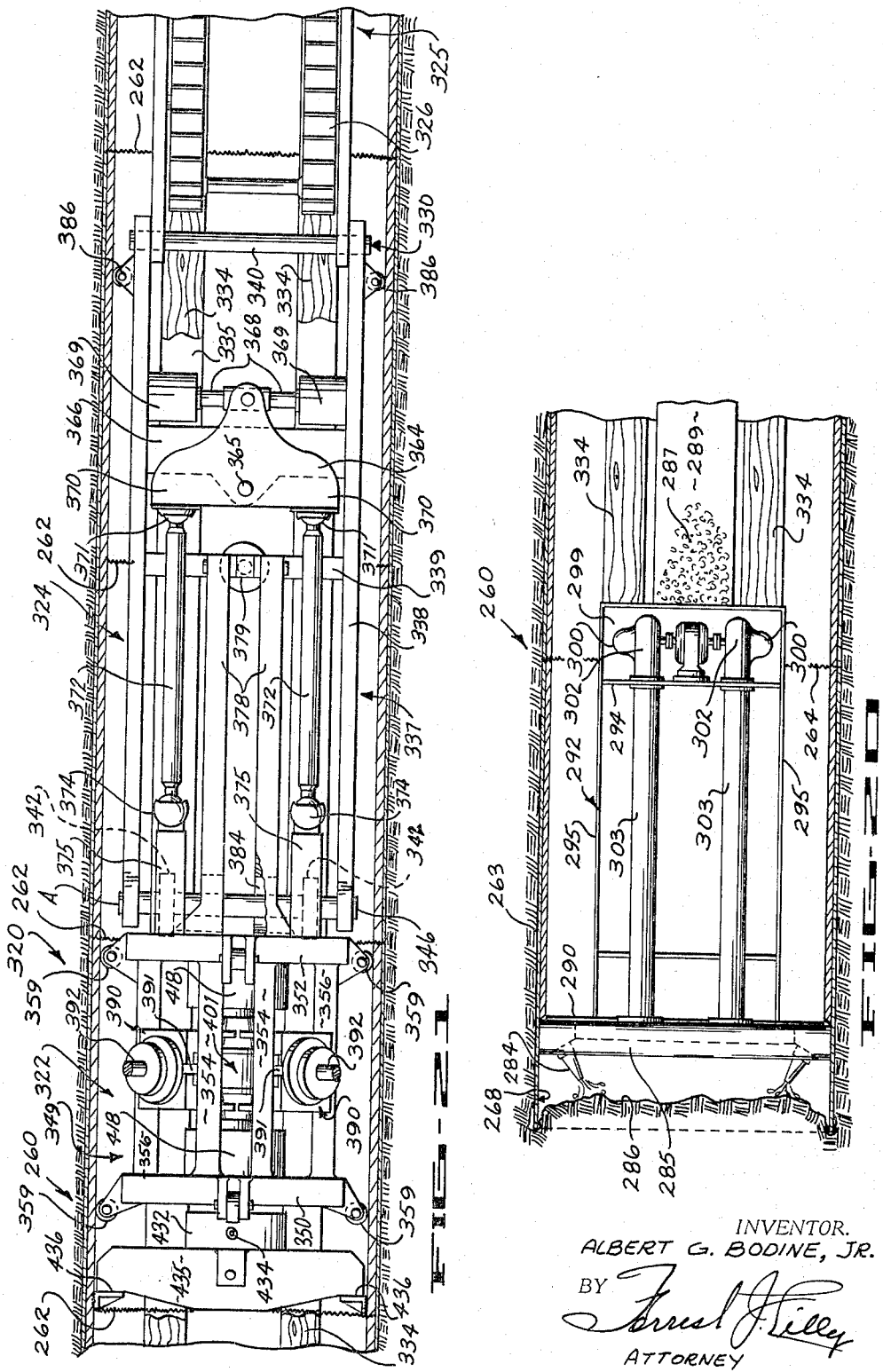

Nov. 8, 1966   A. G. BODINE, JR   3,283,833
SONIC CONDUIT DRIVING SYSTEM
Filed April 20, 1965                    13 Sheets-Sheet 10

INVENTOR.
ALBERT G. BODINE, JR.
BY
ATTORNEY

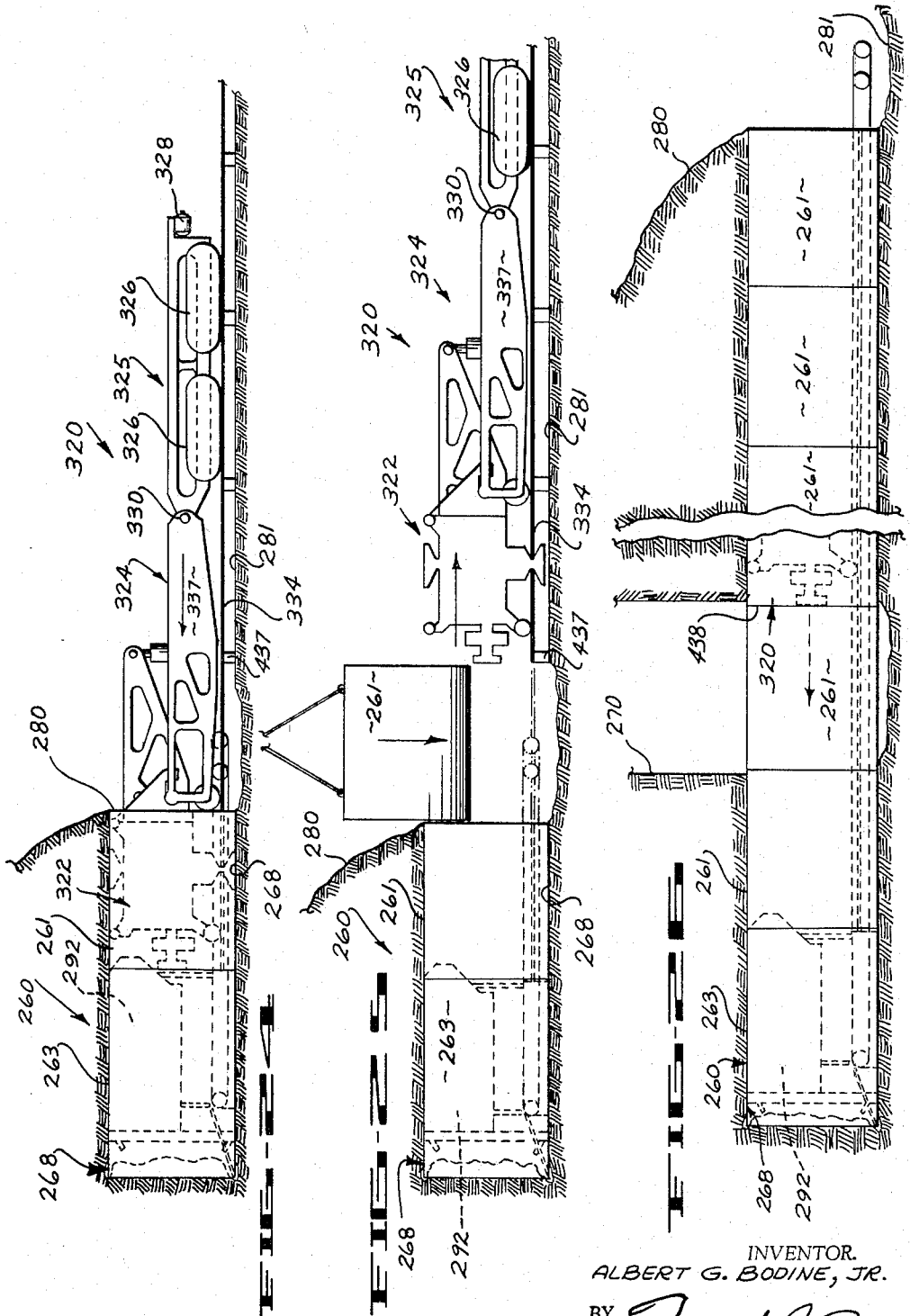

Nov. 8, 1966 A. G. BODINE, JR 3,283,833
SONIC CONDUIT DRIVING SYSTEM
Filed April 20, 1965 13 Sheets-Sheet 12
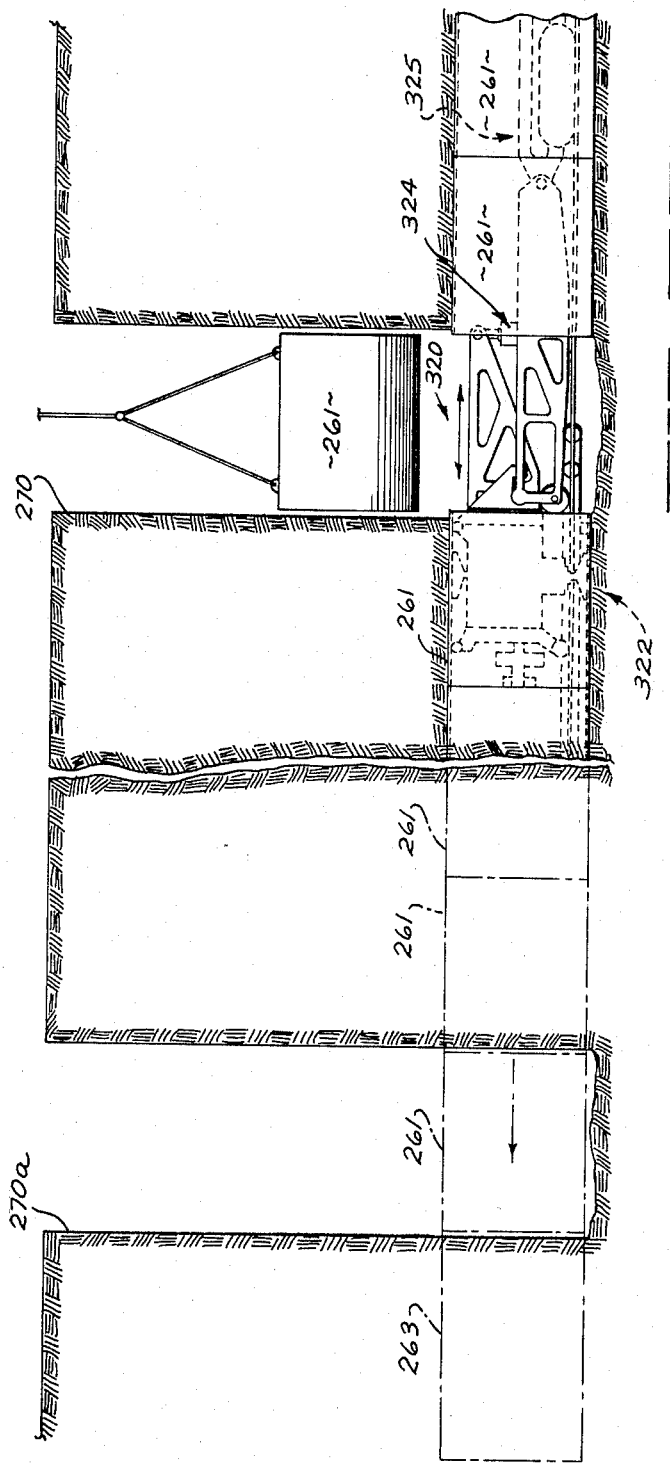
INVENTOR.
ALBERT G. BODINE, JR.
BY
ATTORNEY Nov. 8, 1966   A. G. BODINE, JR   3,283,833
SONIC CONDUIT DRIVING SYSTEM
Filed April 20, 1965   13 Sheets-Sheet 13
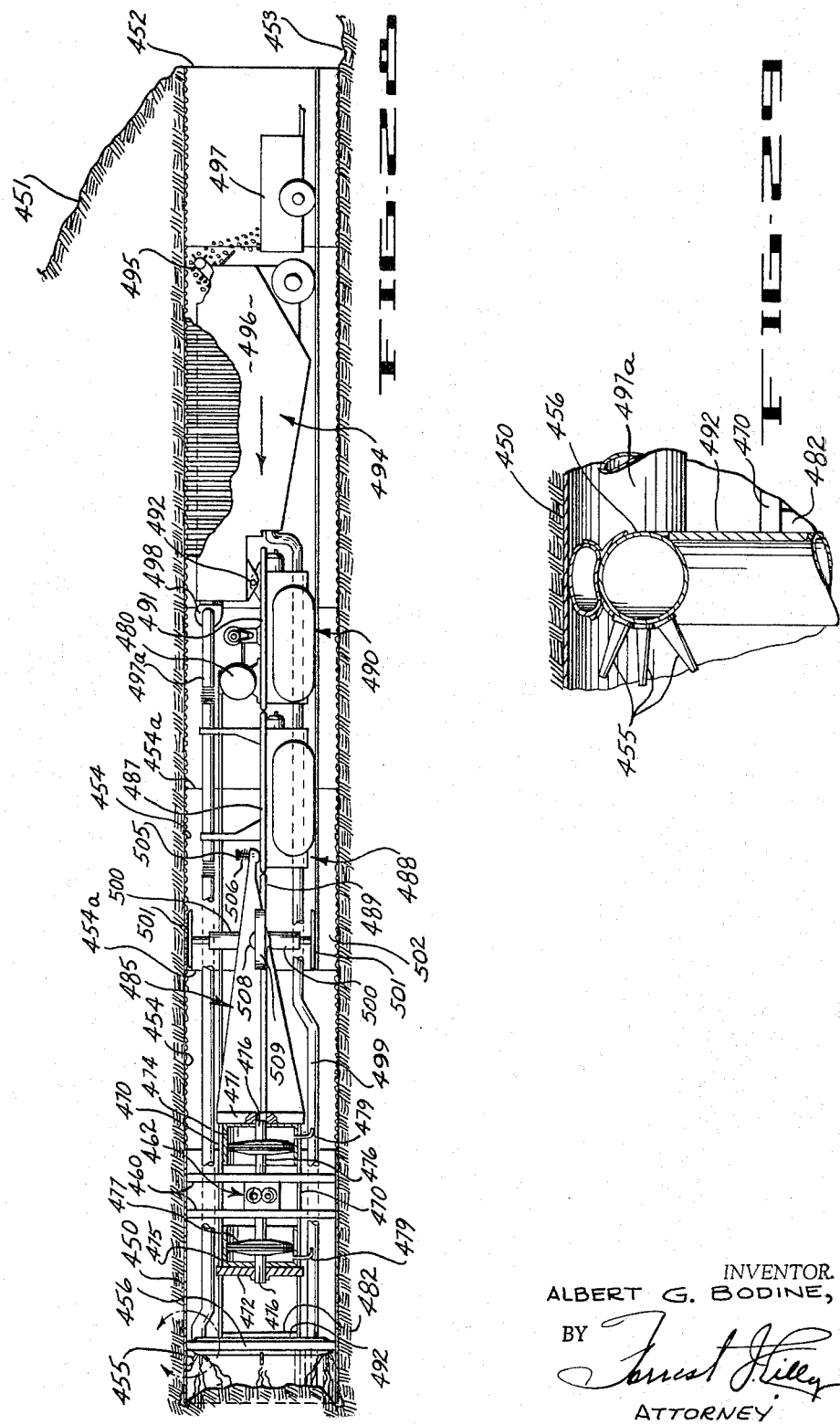
INVENTOR.
ALBERT G. BODINE, JR.
BY
ATTORNEY

United States Patent Office 3,283,833
Patented Nov. 8, 1966

3,283,833
SONIC CONDUIT DRIVING SYSTEM
Albert G. Bodine, Jr., Los Angeles, Calif.
(7877 Woodley Ave., Van Nuys, Calif.)
Filed Apr. 20, 1965, Ser. No. 449,395
19 Claims. (Cl. 175—56)

This application is a continuation-in-part of my copending application entitled Sonic Conduit Driving System, Serial No. 198,783, filed May 31, 1962, now abandoned.

This invention relates generally to methods of and means for driving pipe through the earth in substantially a horizontal direction, such as, for example, to install a horizontally running pipe through the ground under and existing building structure, or, as other examples, to drive large diameter pipe such as culverts, tunnels, horizontal mine shafts, and the like.

A general object of the invention in one of its important forms is to drive the pipe by virtue of longitudinal sonic vibrations, i.e., compressional waves, set up in the pipe, and to accomplish this driving with a minimum of disturbance to surrounding earth and earth-supported structures.

The invention makes use of an earth fluidizing phenomenon when a longitudinally sonically vibrating conduit is pressed against the earth under a suitable biasing pressure. Under these circumstances, the pipe or conduit rapidly penetrates the earth, and may be driven in to many feet in depth. The earth fluidizing phenomenon mentioned is one wherein the vibrating conduit, vibrating through a relatively short displacement distance but with great force, causes the earthen material in front, rock as well as soil, to become finely divided, and to enter into a dynamically suspended state wherein it flows almost as a liquid to make way for the pipe. In some practices of the invention the rock material encountered fractures by elastic fatigue under the alternating or cyclic compressional and tension states induced in it, and rapidly disintegrates. Large rocks or boulders simply move to one side under the influence of the pipe vibrating thereagainst. Large diameter pipe, capped at the end, can thus be forced straight ahead through earthen material. It can make its own "hole," or in certain cases a pre-drilled hole may be formed, and the pipe then driven into this hole by the method and apparatus of the invention.

Reference is here made to a discussion of certain acoustic phenomena involved in the invention and to certain definitions to be found in the latter portions of this introductory part of the specification under the heading "Acoustic Discussion."

In one simple illustrative embodiment of the invention, the front end of the pipe to be driven is engaged with the earth, as at a bank, and to the other end thereof is acoustically coupled, as by direct mechanical connection, a vibration generator or oscillator, the latter having an operating frequency which corresponds with a resonant frequency of the conduit for a mode of elastic wave vibration. To the pipe is also coupled a vibration isolation means, e.g., an air spring through which a bias force can be transmitted to the pipe from a unidirectional force-exerting means; and to the latter is connected a reaction-receiving means which is adapted for reaction engagement with the earth. The vibration generator is preferably of an orbital mass type, explained hereinafter, and comprises a mass-type device which is caused to vibrate so that it delivers a powerful alternating force to the end of the pipe, at a resonant frequency of the pipe for a mode of elastic vibration. Assuming a resonant frequency alternating force, the pipe then vibrates with a resonant elastic standing wave therein. The elastically vibratory pipe, under these conditions, is of a distributed constant character, having elements or constants of both mass and elasticity distributed along its length. These distributed mass and elastic elements function, at the resonant frequency to counteract one another, permitting the pipe to be vibrated by the oscillator, ideally with none of the output force of the oscillator consumed in vibrating the pipe mass, and all of the available output force applied to moving the pipe against frictional and other energy dissipative losses. This ideal may not be precisely achieved in practice, but can often be closely approached.

Also, other components of the equipment may be incorporated in a system which resonates more as a whole. Thus the oscillator or vibration generator housing and the mechanically vibratory part of the air spring comprise lumped mass elements of the acoustic circuit of the system, while the compressed body of air in the air spring comprises an elastic stiffness element or compliance thereof. The mass and elastic constants of these components can advantageously be adjusted relative to one another and to the operating frequency so that an over-all resonant system is attained, in which the masses and elastic compliances are balanced, so as to reduce or eliminate the force wastage otherwise caused by such elements.

As suggested above, the pipe to be driven can have a sonic standing wave set up therein, using a vibratory pipe driving means (vibration generator) and isolator spring, all interconnected in a resonant system.

A still further practice of the invention, especially suited to driving of short pipes or pipe sections, is to make no attempt to set up a sonic standing wave in the pipe itself, but to cause it to vibrate bodily, more or less as a "lumped mass," set into vibration in a resonant acoustic circuit which includes a vibratory resonance means or device that is separate of the conduit. The circuit means in this case again includes a vibration generator or oscillator. Sufficient compliance reactance is used in the circuit means to substantially or largely balance the mass reactance thereof. To this end, the necessary compliance reactance can be incorporated in said resonance means. The conduit may then behave primarily as a lumped mass constant, and the mass reactance owing to this lumped mass, together with that of the generator and other parts, may be balanced or "tuned out" by the compliance reactance of the resonance means. Or, the separate resonance means can be mainly a compliance which resonates with the mass of the oscillator and other associated masses to tune out the mass reactance of the latter, so that a resonant vibratory behavior of the conduit itself is not necessary to tune out the masses of the oscillator body and associated parts. Also, this additional resonance means or device can, in accordance with the invention, be configured to afford the further important function of isolation of the sonically vibratory circuit or system, so that the support and guiding structures, particularly at the drive end of the conduit, as well as the structure and equipment which provides the forward force bias or push on the conduit, all are isolated from the sonic vibration of the conduit and/or its associated sonic circuitry. For example, by making the additional resonance member in the form of a laterally vibratory resonant beam, the nodes thereof afford advantageous and relatively acoustically quiet mounting or attachment points.

An important modification of the invention utilizes a mandrel or stem either inside of or outside of the actual conduit or pipe, and in this case it is this mandrel that is subjected to vibration, rather than the conduit itself, so that the mandrel thus becomes the primary sonic wave or vibration "transmission line." The mandrel is accordingly designed with generously high mass per unit length, for good transmission of sonic energy. Assume the mandrel to be of the hollow type which slips over the outside of the conduit to be driven; it becomes the primary vibratory member working against the earth. In this form of the invention, it is possible to drive delicate conduit into and through the earth, made, for example, of materials which could not withstand the direct vibratory action necessary when it is a conduit itself that is to work its way into the earth. In this case, of course, the mandrel simply substitutes during driving for the ultimate conduit. Usually, the mandrel is extracted after the conduit is driven, and the extraction process can be aided by sonic action, if desired. Thus the mandrel can be used over and over again as a sonic tool. Actually, the mandrel can often be designed to give better sonic power transmission than the conduit desired to be installed. Additionally, the conduit then need not be involved particularly in the sonic power transmission process. Good latitude in selection of materials and construction is thus afforded.

Because the sonic action causes a dynamic fluidization of the adjacent earth, it is readily capable of being directed as driven. Thus, lateral guiding means or jig structures can be applied to the conduit to change or correct its direction as it progresses forward.

One application of the invention resides in driving one conduit through another in a closely fitting telescopic relationship, such as in the repairing or replacement of old or damaged conduit. In such cases, the sonic action greatly reduces the friction between the two pipes and enables easy installation.

An important practice of the invention utilizes a vibratory mandrel stem capable of soil penetration under sonic action, with the conduit member in the form of a jacket which is first installed over the mandrel stem. With this combination, the mandrel with its jacket conduit is sonically driven, and the mandrel subsequently withdrawn, leaving the conduit in place. The alternative is to have the mandrel slipped over the outside of the conduit, or to have both internal and external mandrels. For deep penetration, the invention involves the addition of successive lengths to the mandrel, and to the conduit, usually at the point where the conduit enters the ground soil.

As indicated above, the mandrel system is especially useful for driving thin-walled, or otherwise delicate conduit. The mandrel can be a fairly robust column, such as a solid metallic stem, giving high acoustic Q to the whole system, and capable of transmitting substantial sonic power, even accomplishing sonic driving of soft conduit into hard earthen formation. For example, the system is applicable to sonic driving of plastic pipe. The mandrel can also be formed as a relatively strong or thick-walled tube, which can also afford high Q to the system, and can transmit substantial sonic power. The factor Q will be understood to be a figure of merit in vibratory systems, and is a measure of energy storage per half-cycle in the vibratory system, giving a property somewhat analogous to flywheel effect in rotary systems.

The invention is also applicable to and concerned with sonic methods and apparatus for driving relatively large diameter tubes, such as for tunnels, horizontal mine shafts and the like.

In the driving of small-diameter pipes, or even pipes up to several feet in diameter, the pipes can be driven with the forward ends thereof closed by suitable caps. The fluidization effect on the earth arising out of the sonic agitation produced by the process permits such closed ended pipe to work its way readily through the soil, actually moving large boulders out of the way. However, in the preferred embodiment of the invention for larger tunnel pipes, the pipe is driven open-ended, so that the resistance to forward progress is presented only by the edge of the pipe. The central core can then be easily removed by standard mucking processes, including that of using a liquid wash system.

It is to be noted that the sonically driven pipe, whether of small size, or of large, tunnel size, can be continually added to after convenient longitudinal intervals of the pipe have been driven ahead, such as by welding in additional sections as it is driven on through the ground.

In tunnel driving practices of the invention, a large sonic oscillator is used, and may be hydraulically clamped to the pipe, in a manner such that it can be easily removed for the various operations that are auxiliary to the basic driving of the pipe itself. For example, it is sometimes desirable to remove the oscillator for permitting mucking operations, wherein a mobile vehicle such as a skip loader can be run on into the pipe while bringing out the core of soil. The elastic structure between the oscillator and the clamp mechanism which engages the pipe can participate in the resonant vibration and thereby function as an acoustic lever, improving the sonic power delivering process of the oscillator. In this performance the clamping mechanism and its associated elastic structure can be considered primarily as a compliance reactance, with the oscillator body functioning primarily as a lumped mass having mass reactance. Thus, the capacittaive reactance tends toward tuning out the undesirble mass reactance or inertia of the oscillator body.

An important feature of the invention in some of its practical embodiments is that the oscillator or vibration generator be driven from its prime mover through a flexible power delivering means, such as a flexible drive shaft, or a drive shaft including universal joints, so that the prime mover does not have to undergo the substantial oscillation or vibration of the oscillator housing. In this arrangement, the prime mover is located on a portion of the system which is isolated from the vibratory action of the oscillator.

One advantageous embodiment of the invention utilizes a pair of compressed air springs, which tend to center the oscillator in space between the heads of the two cylinders comprising the air springs. The oscillator is thereby vibration-isolated from the framework in which it is mounted. One advantage of the air spring type of isolator is that the spring rate can be adjusted simply by changing the air pressure in the air spring. Because there is generally a small leak around the piston rings, it is desirable to have a small air compressor floating on the line keeping these air springs pumped up to full operating pressure in spite of such incidental links. Because of its capability of being embodied easily at a large diameter, such an air spring can be easily arranged to handle a large total force, and therefore provide an effective isolation for a large thrust such as that illustrated by certain of the illustrated embodiments of the invention using a power vehicle for application of bias thrust. Also, in order to assure really effective vibration isolation, it is generally desirable that the air springs have a relatively large cylinder volume between the piston and the cylinder head, so that the spring rate is not excessive.

In the type of air spring device referred to in the preceding paragraph, it is generally desirable that the stems extending oppositely from the oscillator into the air cylinders, and which carry the pistons therein, be afforded with fairly robust guide bushings to maintain good alignment of the parts.

Another embodiment of the invention illustrated and disclosed hereinafter incorporates an isolator with a tuned vibratory bar system, vibrating in a standing wave mode, the nodes of which provide substantially fixed mounting points for the bar whereby effective isolation can readily be attained. Such a tuned bar system also aids in counteracting the inertia of the body of the oscillator by contributing a substantial degree of compliance reactance, thereby counteracting and relieving undesirable loading of the clamp means and the conduit by the vibratory inertia of the oscillator body.

In some forms of the invention, the clamping means for clamping the oscillator to the conduit embodies a plurality of pistons working against two jaws which come into sonic power delivering engagement with the conduit which is to be driven. It is of course essential that the tooth jaws be sufficiently large in total effective surface area so as to obtain a powerful clamping action. This high force clamping action is needed because in a system such as the present one, the oscillator develops very high sonic impulse forces, often up to or in a range of over one-half million pounds per cycle.

A feature of the invention is that the pipe is subjected not only to a vibratory action (usually longitudinal, though lateral vibration is also useful), but also to a forward bias thrust. This bias thrust is derived in some instances from a screw-jack type of appliance, having a reactive engagement with the ground, and sometimes by means of a thrust producing vehicle, such as a crawler type vehicle, also in reactive engagement with the ground. In addition, it is possible to produce the necessary bias by first running a cable through the ground, reaching from the termination point, and attaching this cable to the pipe, so that the pipe is literally pulled as it is sonically activated for progression through the earth. Here the cable merely presents sufficient bias force to keep the pipe acoustically coupled to the earth. It does not pull the pipe through the earth in the manner of a plow or some other device wherein the pulling action actually cuts the soil. A frequency responsive elastic compliance coupled between the pipe and such a cable will effectively isolate the latter, particularly if a mass or inertia element is coupled between the compliance and the cable.

ACOUSTIC DISCUSSION

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e., cyclic elastic deformations, which travel through a medium with a characteristic velocity of propagation. If these vibrations travel longitudinally, or create a longitudinal wave pattern in a medium or structure having uniformly distributed constants of elasticity of modulus, and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant," and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutually influencing effects like equivalent factors in alternating-current electrical systems. In fact, in both distributed and lumped constant systems, mass is mathematically equivalent to inductance (a coil); elastic compliance is mathematically equivalent to capacitance (a condenser); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, there latter do not result in the benefits of my sonic or elastically vibratory action.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high level of sonic energy, to which a constant input and output of energy is respectively added and subtracted. Circuit-wise, this Q factor is numerically the ratio of mass reactance to resistance. Moreover, a high Q system is dynamically active, giving considerable cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi fM$. It is analogous to electrical inductive reactance, just as mass is analogous to inductance.

Elastic compliance reactance is the negative imaginary part of impedance, given by $$\frac{1}{2\pi fC}$$

Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) become zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my invention always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high-impedance systems having high Q at high frequency, I sometimes prefer that the resonant elastic system be a bar of solid material such as steel. For lower frequency or lower impedance, especially where large amplitude vibration is desired, I use a fluid resonator. One desirable species of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscllator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

The invention will now be further understood by referring to the following detailed description of a number of illustrative embodiments thereabove, reference for this purpose being had to the accompanying drawings, in which:

FIG. 1 is a somewhat diagrammatic view, partly in side elevation and partly in longitudinal section, showing an embodiment of the invention in service;

FIG. 2 is a section taken on line 2—2 of FIG. 1;

FIG. 3 is a diagram representative of a typical standing wave pattern such as may be set up in the conduit during the practice of the invention;

FIG. 4 shows a modification of the system of FIGS. 1–3, wherein the pipe to be installed surrounds a mandrel which is directly sonically driven by the apparatus of the invention;

FIG. 5 is a fragmentary section taken on line 5—5 of FIG. 4;

FIG. 6 is a view similar to FIG. 5, but showing a further modification illustrating the use of a hollow mandrel outside the pipe to be driven, and as an option, a mandrel also inside said pipe;

FIG. 6a shows, to reduced scale, the rearward end portion of the mandrel and pipe combination of FIG. 6;

FIG. 7 is a side elevational view of another embodiment of the invention, adapted for somewhat larger diameter pipe;

FIG. 8 is a section taken on broken line 8—8 of FIG. 7;

FIG. 9 is a section taken and indicated by line 9—9 of FIG. 7;

FIG. 10 is a fragmentary view taken from FIG. 8 and showing parts in section;

FIG. 11 is a longitudinal section taken through the vibration generator, on line 11—11 of FIG. 12;

FIG. 12 is a section taken on line 12—12 of FIG. 11;

FIG. 13 is a side elevational view of a portion of another embodiment of the invention, showing in this case an apparatus more particularly designed for still larger diameter pipe;

FIG. 13a is a fragmentary view, in section, of the area partially ringed by the curved arrow 13a—13a in FIG. 13;

FIG. 14 is a plan section taken in accordance with line 14—14 on FIG 13;

FIG. 15 is a transverse section taken in accordance with line 15—15 on FIG. 13;

FIG. 18 is a longitudinal vertical section taken through another embodiment of the invention;

FIG. 19 is a continuation to the right of the subject matter seen in FIG. 18;

FIG. 20 is a plan view of the apparatus within the left-hand end portion of the conduit in FIG. 18, the upper half of the conduit being removed;

FIG. 23 is a transverse section taken on line 23—23 of FIG. 18;

Figure 16:
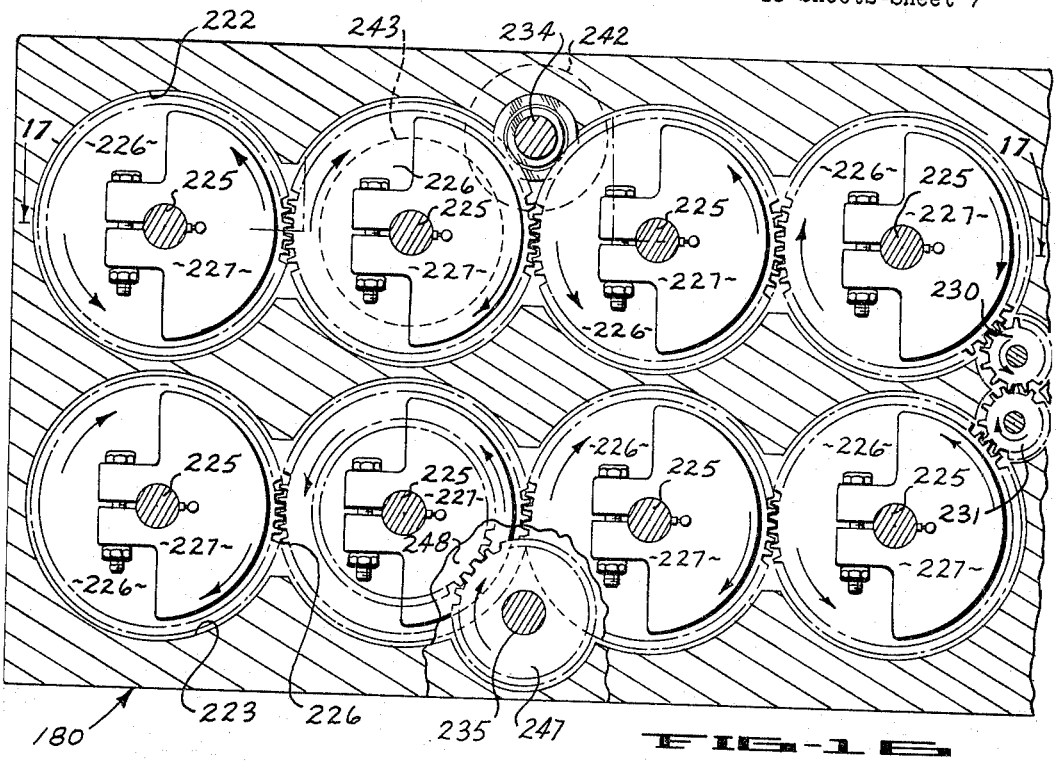
FIG. 16 is a vertical longitudinal section through the vibration generator, being taken on section line 16—16 of FIG. 17.

FIGS. 24–27, inclusive, are diagrammatic views showing successive stages in the operation of the system of FIGS. 18–23;

FIG. 28 is a diagrammatic longitudinal section of a further embodiment of the invention; and FIG. 29 is a section to an enlarged scale of a portion of FIG. 28.

In FIGS. 1–3 of the drawings, numeral 10 designates generally any earth-supported building structure, and numeral 11 the underlying earth, which has been formed with an exposed bank 12 to one side of the building structure, and which has a somewhat irregular surface area 13 beyond bank 12, and at a level some feet below the foundation structure of the building.

At 14 is indicated a steel or other elastic pipe or conduit composed of steel, wrought iron, fiber glass, or other suitable material, which is in course of being driven horizontally into bank 12 and under the building structure, for any of a number of possible purposes, such as to provide a service water connection, a drain pipe, electric wire conduit, or to perform any other function. The exterior or rearward end of this pipe or conduit 14 is received in a coupling collar 15, and may be clamped therein as by means of a clamp screw diagrammatically indicated at 16. The forward end of pipe 14 may be closed or capped, but alternatively, the pipe can be driven open-ended.

The pipe coupling collar 15 projects from and is fastened to the front of the housing 18 of a vibration generator or oscillator generally designated by the reference character G, and which contains means for imparting to the housing, and thence to the pipe 14 clamped within the coupling collar 15, a vibratory motion in a direction longitudinally of the pipe 14. The body or housing 18 comprises, in brief, a means for exerting an alternating force against the end portion of the pipe 14 in a direction longitudinally thereof, and is of course of substantial impulse, capable of generating compressional (sonic) waves which travel down the pipe 14 with the speed of sound (16,000 feet per second in the case of steel). The frequency of the vibration is made sufficient that a standing wave is developed in the pipe, and may typically be in the approximate range of, say, from something over 100 c.p.s. to around 400 c.p.s., or even lower or greater than that range for certain cases, depending upon the length of the pipe and the speed of sound therein. The frequency is preferably adjusted to resonance for the length of the pipe by appropriate regulation of the driving means for the vibration generator, all as will be discussed in more particular hereinafter.

Extending rearwardly from generator housing 18, and coupled thereto, for example as diagrammatically indicated at 20, is a short shaft 21 carrying a piston 22 which works in an air cylinder 23, the latter having an axial sleeve 23a which slidably fits the shaft 21. The cylinder space 24 on the near side of the piston may be vented to atmosphere, as indicated at 25; and the cylinder space 26 on the far side of the piston is supplied with air under compression, via a hose 27 connected to a suitable source of supply, not shown, so that a body of compressed air is maintained in chamber 26 to furnish air spring action.

Extending rearwardly from the head end of cylinder 23 is a shaft 30 having a ball and socket coupling at 31 with a long screw-threaded shaft, or lead screw, designated by the numeral 33. This lead screw 33 has a cross bar 34 by which it may be manually rotated, and it passes through a nut member 35, understood to contain internal screw threads meshing with those of the shaft 30, and which is firmly anchored to a substantial vibration attenuating mass, preferably the earth itself. Typical earth anchorage means are shown in the drawings, including a pair of legs 36 pivotally connected to nut 35 as at 37 and formed at their extremities with earth-engaging feet or flanges 38. There is also illustrated an additional anchorage means, a "dead man" 39 buried in the earth and connected by rods 40 and 41 and a turnbuckle 42 to the body of nut 35. By this means a very firm anchorage is made to the earth, and the earth functions as a mass which has a vibration attenuative effect on the system, and holds the air cylinder 23 against vibration of material amplitude. In effect, these anchorage elements comprise means for reaction engagement with the earth.

Returning now to a consideration of the vibration generator, a type is shown such as disclosed and claimed in my copending application entitled Vibration Generator for Resonant Loads and Sonic Systems Embodying Same, filed March 21, 1962, Serial No. 181,385. Other types of vibration generators are capable of use in the invention, but that shown herein, and in a more refined form in said copending application, is presently preferred.

With reference now to FIG. 2, generator housing 18 comprises an intermediate body member or block 45, and two end plates 46 and 47, end plate 46 being removed to expose underlying members in FIG. 1. Block 45 has two raceway bores 48, one over the other, and each contains an inertia rotor 50. Each such rotor 50 embodies an inertia roller 51, of somewhat less diameter than the corresponding raceway bore 48, and which is rotatably mounted on an axle 52 projecting axially from the hub portion of a spur gear 54, whose pitch circle is substantially of the same diameter as roller 51. Gear 54 meshes with an internal gear 55 formed or mounted within housing body 45 concentrically with the corresponding raceway bore, and whose pitch circle is substantially of the same diameter as said bore.

Each rotor 50 is designed to turn in an orbital path about its raceway 48, with gear 54 in mesh with ring gear 55, and with inertia rotor 51 rolling on the bearing surface afforded by the bore 48. To maintain the roller 51 in proper engagement with the raceway or bearing surface 48 while the generator is at rest, or coming up to speed, the axle 52 of the rotor is provided with an axial pin 56 which rides around a circular boss 57 projecting inwardly from side wall 46 on the axis of the raceway bore 48.

Generator housing 18 is here shown as mounted on a horizontal base plate 60, between guides 61, and it is to be understood that the generator housing is capable of limited vibratory movement on base plate 60 between these guides 61, in a direction perpendicular to the plane of the paper as viewed in the aspect of FIG. 2. Cylinder 23 is also mounted on base plate 60, as by means of support 23b. The base plate 60 is located on a horizontal platform 62, suitably blocked up on the earth, so as to provide a level surface on which the base plate 60 and parts supported thereon can move toward the earth bank 12 as the pipe is driven into the ground.

The two rotors 50 are driven through a pair of drive shafts 64, each of which has a universal joint coupling 65 to the corresponding spur gear 54. The lower of the two shafts 64 is connected through a universal joint 66 to the extremity of a shaft 67 mounted coaxially with the lowermost raceway bore 48, and driven from a suitable drive means 68. The drive means 68 should be one capable of variable speed, or speed regulation. It may typically be a series-wound direct-current motor, or may be a conventional motor-driven variable-speed drive means. Shaft 67 extends through a gear housing 70, and has mounted thereon, inside said housing, a spur gear 71, which meshes with a spur gear 72 on a shaft 73. Shaft 73 is coaxial with the upper raceway bore 48 and has a universal joint coupling 74 with the uppermost of the two generator drive shafts 64. Gear housing 70, as well as motor 68, are fastened down to the common base plate 60 that supports the generator housing 18, it being recalled, however, that the generator housing 18 is capable of vibratory movement relative to base plate 60, while the gear housing 70 and motor 68 are preferably firmly secured thereto.

The operation of the vibration generator is as follows: Rotation of shafts 64, which turn in opposite directions, rotates the two spur gears 54 around the internal gears 55, the two shafts 64 each moving in a conical gyratory fashion. The inertia rollers 51 roll on the raceway bearing surfaces 48, so that the rotors 50 move therearound in orbital paths. The centrifugal force developed by the rotors moving in these orbital paths is taken by pressure of the rollers 51 on the surfaces of the raceways 48. The rollers 51 turn at nearly the same rate of rotation as the gears 54, but with some slight variation or creep therebetween, which is accommodated by the rotatable mounting of the rollers 51 on the gear shafts 52. The two inertia rotors thus exert gyratory forces on the housing 18. The rotors 50, however, are phased so that the vertical components of their motions will be always equal and opposed, while the horizontal components thereof will be in phase or in step with one another. This is accomplished in the original setting of the rotors by means of the interconnecting gearing. For example, as shown in FIG. 2, the two rotors may be set so that one is at its extreme uppermost position while the other is at its extreme lowermost position. Accordingly, the rotors move up and down with equal and opposed movements, and the vertical components of the reactive forces exerted thereby on the housing 18 are equal and opposed and cancelled within the housing. On the other hand, the gyrating rotors move horizontally in step with one another, so that the horizontal components of their reactive forces exerted against the housing 18 are equal and in phase, and the reactive forces experienced by the housing 18 are therefore additive. The housing 18 therefore exerts an alternating force along a direction line perpendicular to the paper in FIG. 2, and in longitudinal alignment with the pipe 14 to be driven in FIG. 1. It will be observed that the type of generator disclosed in FIG. 2 has a desirable frequency step-up characteristic from drive motor input to vibratory housing output force, in that for each orbital trip of a given gear 54 and its corresponding inertia roller 51 around the inside of internal gear 55 and raceway bore 48, and shaft 64, gear 54 and roller 51 make only a small fraction of a complete revolution on their own axes. The shafts 64 thus gyrate in their conical paths at greater frequency than their own rotational frequency on their own axes. Thus the orbital frequency of the inertia rotors 51, and the vibration output frequency of the generator housing, is correspondingly multiplied over the rotational frequency of the drive motor 68. A simple low-speed drive motor may thus be used, and a desirably high vibration frequency obtained therefrom.

The apparatus is set up typically as represented in FIG. 1, which shows a stage after the pipe has been driven some feet into the earth. At the beginning, the apparatus will be understood to have been somewhat further back from bank 12, with the end of the conduit 14 in engagement therewith, and with the handle end of lead screw 33 not far from nut 35. Compressed air is supplied to air spring chamber 26, and handle bar 34 rotated to advance lead screw 33 towards the bank, and to a point such that piston 22 is supported by the lead screw in an intermediate position in cylinder 23, as illustrated.

The compressed air in the air cylinder acts against the piston 22, and thereby a biasing force is transmitted from said piston through rod 21 to the generator housing and from the latter to the corresponding end of pipe 14, so that the opposite end of the pipe is forced against the bank. The vibration generator G is then driven by motor means 68, so as to deliver a vibratory or alternating output force from the generator housing against the adjacent end of pipe 14. Pipe 14 is thereby set into vibration, and the combination of this pipe vibration and the bias force exerted against the pipe through the air cylinder causes the pipe to penetrate the earth.

It will be seen that the vibration generator G, pipe 14, rod 21 and piston 22 are permitted freedom for vibration while, owing to the vibration isolation action of the air spring constituted by the air cylinder and piston, very little of this vibration is transmitted back through rod 30 and lead screw 33 to the surrounding environment. This vibration isolation attainment is contributed to by high impedance mass effect of the earth body to which the lead screw is anchored, and which presents a large vibration attenuative factor. It will be noted that the resistive impedance of this earth body will usually be as high as the resistive impedance of that portion being penetrated by the sonically activated conduit.

For most effective action, the drive means for the vibration generator is adjusted in speed to produce longitudinal standing wave resonance in the pipe being driven. For example, assume a 40-foot length of steel pipe, and velocity of sound of 16,000 feet per second therein. Ignoring lumped constant effects of the generator mass and the compliance of the air spring, the frequency for full-wavelength standing wave resonance would be 16,000/40, or 400 cycles per second. The system might alternatively be operated for half-wavelength standing wave resonance, at 200 cycles per second. Actually, because of lumped constant effects of the generator and air spring in either the full-wavelength or half-wavelength case, resonance will be obtained at somewhat lower frequency than just indicated. FIG. 3 represents a possible full-wavelength type of standing wave pattern, with lumped constants of the generator and air spring taken into account. A fully developed velocity antinode (region of maximized velocity oscillation) appears at V, where the end of the pipe engages the ground. A quarter-wavelength distance in back of the antinode V is a node N, and at successive quarter-wave distances in back of node N are a velocity antinode V' and a node N'. Because of lumped constant effects of the generator G and air spring, the distance from node N to the air spring piston is less than a quarter wavelength as indicated.

Such a wave pattern results in a large earth fluidizing effect at the end of the pipe, and an excellent rate of penetration.

The wave pattern as described is substantially a full-wavelength pattern. If the pipe length to be driven is relatively short, or it is desired to use a vibration generator less frequency capability, a half-wavelength type of pattern can be employed requiring only half the frequency of the full-wavelength pattern. The drive means for the vibration generator is of course provided with any suitable or conventional means for varying the drive speed of the generator to attain a desired pattern of standing wave resonance.

When the first pipe length has been driven in substantially its full depth, the driving apparatus can be drawn back, and a second pipe length coupled to the first. Pipe with a flush-type coupling joint can of course be used, as external coupling sleeves or collars impose an additional impediment to driving in some formations. With the added pipe length, the generator speed is again adjusted to a condition of standing wave resonance for the pipe system, and the coupled pipes driven on further through the ground under the building. Assuming a vibration generator of sufficient impulse, this process can be continued to drive the pipe ahead many hundreds of feet. The fluidizing action of the end of the vibrating pipe on the earthen material accomplishes reasonably straight and predictable driving of the pipe or conduit because local variations in soil hardness, such as might otherwise deflect the pipe, are reduced, neutralized or eliminated in effect.

One particular novel feature of the invention is the application of the reaction bias force, which holds the conduit acoustically coupled in its hole, back against a vibration attenuative mass, which may advantageously be a part of the same earth mass through a part of which the conduit is being inserted. An important feature of the invention is that the air cylinder vibration isolation means is a low energy acoustic coupling means at most, and the dynamic vibratory action is therefore primarily confined to the balanced resonant system, so that a minimum of vibratory disturbance of surrounding environment is experienced.

With a resonant standing wave set up in the pipe, as described, the system is relieved of the necessity of dissipating force to vibrate the mass of the pipe. Also, the sonic system as a whole, conduit to be driven, vibration generator, and spring isolator, may be designed to behave as a resonant acoustic circuit. In this circuit, the conduit comprises an elastically vibratory means which is or may be of a distributed constant type, i.e., one having elements or constants of both mass and elasticity distributed along its length. The generator G, and the piston 22 of the air spring comprise lumped mass elements of the vibratory system, and the compressed body of air in the air spring comprises an elastic "stiffness" component, or "compliance," thereof. By adjustment of the mass and elastic constants of these components relative to the driving frequency, an over-all resonance performance can be achieved, in which the mass and elastic compliances are balanced, so as to reduce or eliminate force wastage in vibrating the masses, i.e., in order to "tune out" the force consuming masses.

Particularly with a relatively long length of pipe, the vibration generator may be operated at such frequency that a resonant standing wave is set up in the pipe. No force from the generator is then consumed merely in vibrating the pipe. Alternatively, especially with relatively short pipe, no effort need be made to establish a standing wave in the pipe, which then acts primarily as a lumped mass, though it may have certain cyclic elastic deformation characteristics. In this case, the system is designed for sufficient elastic compliance reactance, particularly in the air spring, such that the over-all vibratory mass reactance of the system at the operating frequency is largely or substantially balanced by the compliance reactance of the system, giving a condition of over-all resonance, and a minimization or (ideally) elimination of force consumption otherwise necessary to vibrate the various mass components of the system, such as the pipe mass, the mass of the generator, etc. Such masses are said to be "tuned out" of the system at the operating frequency. The air spring then can be considered as a resonance means which brings about over-all resonance of the system. It is also a means for desirably boosting the Q of the system.

As referred to hereinabove, I may employ, as illustrated in FIGS. 4 and 5, an elastic mandrel 80 inside the pipe 81 to be driven, and the mandrel 80 may be coupled to the vibration output coupling means 15a of the vibration generator G, as shown in FIG. 4. The vibrations formerly set up in the conduit 14 in the system of FIGS. 1–3 are now to be understood as set up in the mandrel 80 in the modified system here under consideration, it being understood that the modified system may be illustratively like that of FIGS. 1–3 with the sole exception of the use of the mandrel 80 directly coupled to the vibration generator, and placement of the conduit 81 that is to be driven around the outside of the mandrel 80. It will of course be understood that, if a standing wave is developed in the mandrel, the mandrel 80 may be composed of an elastic material such as steel, capable of elastic vibration. The pipe 81 may again be of metal. The term "stem" may be used generally to cover the driven member, whether in the physical form of a pipe or a solid mandrel. A feature of the system in the modified form, e.g., with use of a steel mandrel, is that the pipe may be of relatively fragile character, and the pipe 81 is indicated in FIG. 4 as comprised of some suitable plastic substance suitable to the purpose.

In FIGS. 4 and 5 there is shown a cap member 84 fitted on or over the forward or driving extremity of both the pipe 81 and the mandrel 80. In the specific embodiment here shown, the forward extremity of the mandrel 80 is reduced as at 85 in order to obtain additional annular clearance inside the pipe 81, and a cap or thimble member 86 is fitted on or over this reduced extremity 85, being received inside the forward end portion of the pipe 81, and being formed at its inward end with an outwardly turned lip 87 adapted for tight engagement with the inside of the pipe 81. Over the outside of the thimble 86 is then installed the outside cap 84 which goes on over the outside of the forward extremity of pipe 81, its edge at 89 being inwardly turned to make tight engagement with the outside of the pipe 81. The inside thimble 86 engages the extremity of the mandrel, and the outside cap member 84 is engaged by both the thimble 86 and by the forward extremity of the pipe 81. Vibratory action of the mandrel 80 is thus transferred through the cap to the soil, with the consequence that the capped mandrel and pipe move progressively through the soil in the same manner as the pipe 14 in the case of FIGS. 1–3. The outside cap member 84 will in this connection be seen to be somewhat indented into and to thus grip the pipe, whereby the latter is dragged along with the cap and sonic vibratory mandrel.

FIGS. 6 and 6a show the case of an external mandrel 90, composed of steel, and understood to be coupled at its rearward end to the coupling means of a vibration generator such as G. The pipe in this instance is designated generally by the reference numeral 91, and is shown placed inside the mandrel 90. A cap means 84 is used over the forward extremity of the pipe 80a and may be of the same nature as the cap 84 of FIG. 4. The mandrel 90 is shouldered at its forward end, as at 92′, to engage forwardly against the rearward inturned lip portion of the external cap member 88a, and thus the vibratory action set up in the mandrel 90 is transferred to the cap assembly and thus to the soil to be penetrated. It is contemplated that in the system of FIGS. 6 and 6a, the pipe 91 will usually be driven by the single outside mandrel 90, but there is shown the optional additional use of an interior mandrel 80a going inside the pipe 91, and understood as also adapted for vibration by the generator G. A suitable coupling means to the generator for both mandrels 90 and 80a is indicated diagrammatically at 90a in FIG. 6a. In the use of the system represented in FIGS. 6 and 6a, with a pipe 91 inside an external mandrel 90, the pipe 91 is of course inserted inside the mandrel 90 prior to beginning work, the cap means 84 then installed, and the assembly then driven forward. At the finish of driving, the external mandrel may be withdrawn, and to aid this withdrawal, the vibration generator may again be operated. In this case, of course, the system must be reversed, in that a withdrawal biasing force must be exerted on the equipment.

Reference is next directed to FIGS. 7–12, illustrating a system in accordance with the invention for driving larger diameter pipe, for example, on the order of several inches to several feet in diameter. The pipe to be driven is designated at 92, and is shown in FIG. 7 as going into the ground soil at a bank 93. The forward end of the pipe may be provided with a cap or closure, such as 92a, or can be driven open-ended. The bank 93 is shown as merging with a ground surface 94 on which a crawler-type driving vehicle 95 may travel forward.

The rearward or driven extremity of the pipe 92 is tightly engaged by a clamping means 96, which engages and is mounted against the center portion of an elastically vibratory beam 97 disposed transversely of the axis of the pipe 92 and located symmetrically with reference thereto. The beam 97 is in turn supported, at points located outward towards its ends, by the two arms of a yoke 98. The latter is supported by and against a dozer blade 99 carried by the crawler vehicle 95. As here shown, the blade 99 is supported by a link 100 and a telescopic strut 101, in a fashion known in the art. The yoke 98 has at the rear thereof an enlarged head 104 which engages directly against dozer blade 99 and around which is a supporting sling 105 supported from the top of the blade 99, by clamp means represented generally at 106, or in any manner found suitable.

Giving further attention to the beam 97, it is typically composed of an elastic material such as steel, and, as represented in FIGS. 7 and 8, its cross-section is so oriented as to have the long dimension thereof in a plane through the longitudinal axis of the pipe 92. The maximum stiffness of the beam is thus in this plane. The forward edge of this beam will be seen to be mounted flush against the clamp member 96 in the central region of the beam; and against the rearward edge of the beam 97, again in a central region thereof, is the housing 110 of a vibration generator 111, shown more particularly in FIGS. 11 and 12, and which for the moment may be described as generally of the type to deliver, against the beam 97, an alternating output force such as represented by the double-headed arrow a.f. in FIG. 8, this force being oriented along the central longitudinal axis of the pipe 92. The aforementioned clamp 96 embodies a cross-frame 115 embodying four arms 116 radiating from a central hub structure 117 (FIG. 10) which affords a rearward plane face 118 for direct engagement against the edge of the vibratory beam 97. The hub 117 and arms 116 also afford a forwardly facing flat surface 119 which engages directly against the rearward end of pipe 92, also as clearly shown in FIG. 10. The generator housing 110, vibratory or sonic beam 97, and the central or hub structure of the clamp frame 115 are secured tightly together by means of four tension rods 120, which are secured at their forward ends to the cross-frame 115 as by passing through ears 121 on frame hub 117 and having nut 122 screwed thereon. At the rearward ends of the rods 120, just rearwardly of generator housing 110, said rods 120 pass through a pair of straps or bars 125 which engage against housing 110, and nuts 126 screwed onto the rearward extremities of the rods 120 are set up to secure the assembly tightly together.

Vibration generator or oscillator 111 is driven through its input shaft 128 and a flexible coupling 129 from the shaft of an electric motor 130 which is mounted on a stationary (nonvibratory) horizontally extending framework, of any suitable character, generally designated by the reference numeral 131, and which extends horizontally on each side of generator housing 110 just below the latter. The framework 131 is shown as mounted on a step 132 formed on the lower arm of the yoke 98, and a brace 133 is indicated as connected to the upper arm of the yoke, as indicated in the drawings. On the end of the framework 131 projecting oppositely from the vibration generator housing is a counterweight 135 for the motor 130.

Returning attention to the clamp 96 of pipe 92, the four clamp arms 116 support four radially disposed hydraulic cylinders 138 having plungers 139 carrying clamping pads 140 furnished with arcuate serrated clamping faces 141 adapted for engagement with the exterior surface of the pipe 92. Inside the rearward extremity of pipe 92 (see FIG. 10) is a back-up ring 144, closely fitting the pipe, and preferably this is interchangeable with back-up rings of other diameters for other sizes of pipe. In the present instance, this is accomplished by furnishing the ring 144 with a threaded plug 145 adapted for threaded engagement into a socket 146 formed in the clamp hub 117. It will be clear that when the hydraulic plungers 139 and clamping pads 140 are set up, the clamp 96 is very tightly engaged with and coupled to the pipe 92. From what has been said in the foregoing, it will also be clear that the vibration generator 111, the sonic beam 97, and the clamp frame are all thus tightly coupled to one another as well as to the pipe 92.

In the operation of the device, as will later be described in more detail, a lateral resonant standing wave, such as diagrammed at $st$ in FIG. 7, is set up in the vibratory sonic bar 97 by the vibration generator 111, producing velocity antinodes V of maximized amplitude at the two ends of the bar, a velocity antinode V' of somewhat less amplitude at the midpoint, and nodes N typically at points approximately 17–20% of the length of the bar inward from each of its ends. The nodes N are understood to be regions of zero or minimized vibration amplitude, and are desirable points of support for the bar. Accordingly, the two arms of the yoke 98 are connected, as by pins 150, to the bar 97 at the two nodes N. The bar 97 thus vibrates in a one-wavelength lateral standing wave mode, while being supported at its nodes by the yoke 98 and in turn by the blade 99 and sling 105 carried by the crawler vehicle 95. The described mounting arrangement will be seen to isolate the vibratory action in the beam 97 very substantially from the yoke 98, and therefore from the electric motor 130, as well as from the dozer blade 99 and supporting sling 105. The crawler vehicle 95 will be understood to be self-powered for travel over the ground surface 94, and it will be understood that the vehicle 95 is driven very slowly forwardly during the operation, so as to exert a continuous forward bias force, such as represented by the reference character F in FIG. 7, against the yoke 98, the sonic bar 97, the clamp 96, and therefore also against the rearward end of the pipe 92. The crawler vehicle 95 will be understood thus to comprise a unidirectional-force-exerting means coupled to the yoke 98, functioning as a vibration isolating means, for exerting a unidirectional force through such isolation means for transmission to the conduit in the direction of desired penetration. Moreover, the relatively massive vehicle with its crawlers 95a comprise reaction-receiving means connected to or forming a part of the unidirectional-force-exerting means and comprise or include means for reaction engagement with the earth.

The generator 111 of the embodiment under consideration is shown more particularly in FIGS. 11 and 12, and comprises the aforementioned housing 110, containing two unbalanced weights or masses 160 mounted on parallel shafts 161 journalled in the housing, as clearly illustrated. The shafts 161 carry spur gears 162, each of which meshes with a small individual spur gear 163, and the two spur gears 163 are in mesh, as clearly illustrated. One of the gears 163 is on the aforementioned generator input shaft 128. With the gearing as thus described, it will be clear that the two unbalanced weights 160 will turn in opposite directions when the shaft 128 is driven. The weights 160 are so arranged so as not only to turn in opposite directions, but to move towards and from one another in opposition, and to move laterally in unison. Accordingly, components of vibration from movement toward and from one another, i.e., in the vertical direction, cancel one another, whereas components of vibration in the lateral direction, i.e., horizontally, are additive, and coact to produce the alternating output force a.f. of the generator as referred to hereinabove.

The operation of the modified system of FIGS. 7–12 should be understood to be related in general respects to that of the embodiments of FIGS. 1–3. The air spring of FIGS. 1–3 is in this case substituted for by the elastically vibratory beam 97, vibrating in a standing wave mode as diagrammed in FIG. 7. It is to be understood that the horizontal distances between the two sinusoidally curved lines of the standing wave diagram *st* at points along the length of the beam 97 are proportional to the amplitudes of vibration of the beam 97 at corresponding points therealong; and it will of course be understood that the vibration represented by the diagram occurs in the plane of the paper as viewed in FIG. 7, as well as laterally of or transversely to the length of the beam. The diagram will reveal that at the nodal points of the beam, the vibration amplitude is minimized, and therefore isolated from the beam mounting structure which supports the beam at the nodal points. The nodal point mounting of the beam thus provides the vibration isolator in this case.

When the pipe 92 has attained a fairly good length, sufficient for a longitudinal standing wave to be set up therein at a reasonably attainable frequency, it becomes advantageous to operate at that frequency, i.e. at resonance, for reasons explained hereinabove. However, with shorter pipe lengths, resonant standing wave behavior may not be easily achieved. In such case, it is preferred to set the system up to operate under an overall condition of resonance, with the pipe acting mainly as a lumped mass, contributing some compliance reactance to the system, however, and with the elastic vibratory beam 97 acting as a resonance means which contributes sufficient compliance reactance to the system that the mass reactance is substantially counteracted, and resonance performance approached or attained. Vibratory masses are thus again tuned out of the acoustic circuit or system, and do not consume and waste force from the generator. The laterally vibratory beam as illustrated is designed for high Q, and should be understood as functioning to boost the Q of the system.

Reference is next directed to FIGS. 13–17, inclusive, showing an embodiment of the invention intended for driving of still larger pipe, where very large, heavy and powerful equipment is required.

The pipe to be driven is in this instance designated at 170 and is shown being driven into earth bank 171, the latter merging with substantially horizontal ground surface 172 below the level of the pipe, on which may be supported a sled 173 for the support of the vibration generator and isolator equipment. A crawler vehicle of a type having a dozer blade, such as shown in FIG. 7, for example, but not shown in FIG. 13, can be used as in FIG. 7 to move the equipment forward, and for reaction engagement against ground surface 172.

In this case, and with reference particularly to FIG. 13, the vibration generator or oscillator is designated generally by the reference numeral 180. Its forward end is coupled to the end of the pipe 170 by an adapter frame 181, together with suitable clamping means such as indicated at 182, and an external backup-ring 183 forced on over the rearward extremity of the pipe 170. The clamping means, as here shown, comprises a group of eight radially disposed hydraulic cylinders 184 mounted directly on the front face of adapter 181, and provided with plungers 185 carrying clamping pads 186 which are provided with serrated and properly arcuate clamping faces 187 adapted for engagement with the inner surface of the pipe 170. The clamping pads 186 will be seen from FIG. 13 to engage the pipe 170 within the confines of the back-up ring 183, and thus the pipe 170 is tightly clamped between the clamp pads 186 and the back-up ring 183. The hydraulic cylinder and plunger assemblies are made sufficiently robust and in sufficient number as to transmit adequately the vibratory force impulses from the vibration generator 180 to the clamped rearward extremity of the pipe 170. The hydraulic cylinders 184 are shown as served with fluid under pressure via hoses 189 leading from a hydraulic supply system 200, of any suitable character, which is shown as mounted on the forward end of the sled 173.

A combination vibration isolator, resonance means, and Q-booster is again provided, again in the form of a vertical, transversely oriented elastic bar or beam 202, in which there is set up, by oscillatory force output from the generator or oscillator 180, a lateral standing wave, as represented in FIG. 13 at *st'*. In this instance, the center of the vibratory beam 202 is coupled to the generator 180 with the generator being between the vibratory beam and the pipe, instead of the beam being between the vibration generator and the pipe. Acoustically, however, the two arrangements are clearly equivalent. The beam 202, vibrating with the standing wave pattern *st'*, again has velocity antinodes V at its two extremities, a smaller velocity antinode V' at its midpoint, and the velocity nodes N at points between approximately 17 and 20 percent of the length of the beam inward from its extremities. The beam 202 is again supported at its nodal points N by nodal point pins 206 connecting it to the two sides of a double-walled yoke structure 208. The latter is formed at the back with a rearward projection or head 210, engaging against the blade 211 of the dozer, not shown, but understood, as mentioned hereinabove, to involve a vehicle with ground-engaging means and with a self-propulsion unit by which it is adapted for travel along the ground surface 172 and thus capable of exerting a forward force on the yoke structure 208, with its wheels or crawlers functioning as reaction-receiving means in reaction engagement with the earth. As in the case of FIG. 7, the yoke head 210 is supported by a sling 212 clamped to the dozer blade. Also, in this case, the yoke structure 208 is supported by a leg or column means 216 mounted on sled 173. The upper end of the yoke structure 208 is further supported by a diagonal strut 217 extending upwardly from sled 173.

Figure 17:
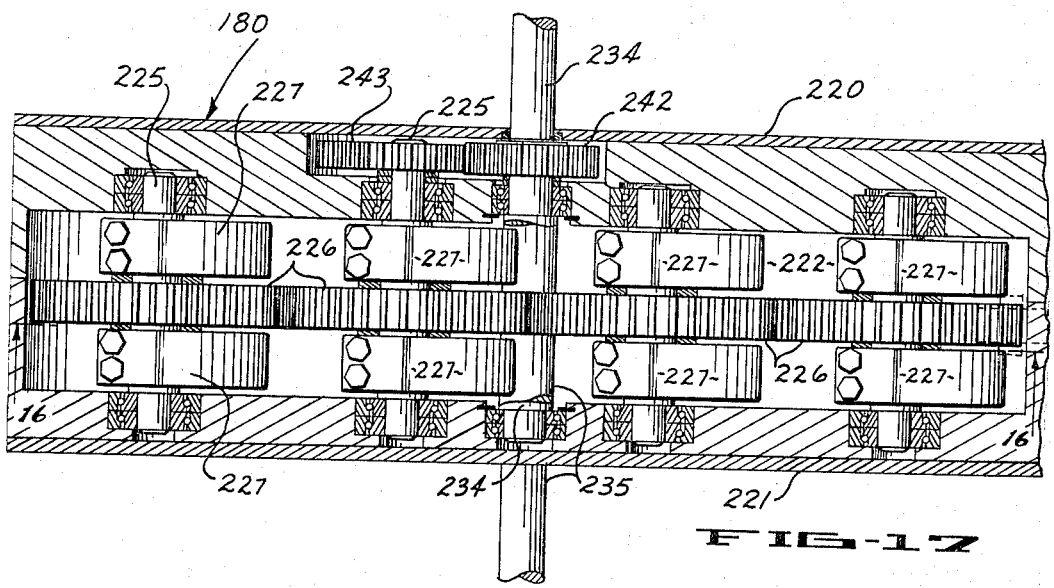
FIG. 17 is a section taken on broken line 17—17 of FIG. 16.

Reference is next directed to FIGS. 16 and 17, showing the internal make-up of the vibration generator or oscillator 180. This oscillator 180 is again of the unbalanced weight or flywheel type such as shown in a simple form in FIGS. 11 and 12, but in this case is made far more powerful by use of multiple unbalanced rotors or weights. The generator 180 has a relatively heavy generally rectangular housing, affording relatively massive walls 220 and 221, inside which are formed upper and lower gear and rotor chambers 222 and 223. Extending across the chambers 222 and 223, between bearings set into wall portions 220 and 221 are shafts 225 which carry meshing spur gears 226, and on each side of each of said gears an unbalanced rotor 227. In this instance, there are four of the shafts 225 across upper chamber 222, and four of the shafts 225 across lower chamber 223. All of the spur gears 226 for the upper chamber mesh with one another, and all of the spur gears 226 for the lower chamber mesh with one another. Two idler gears 230 and 231 mounted at one end of the housing mesh with one another, and the upper gear 230 meshes with the end gear 226 in upper chamber 222, while the lower gear 231 meshes with the end spur gear 226 in lower chamber 223. With these gear connections, the upper and lower gears 226 of each vertical pair turn in opposite directions, and each gear 226 turns in the opposite direction from each horizontally adjacent gear. The rotors 227 are all positioned as indicated in FIGS. 16 and 17, so that when the gears are driven, turning in the direction of the arrows, all unbalanced rotors 227 move vertically in opposition to one another, and therefore contribute no net or resultant vibratory force. On the other hand, all of the unbalanced rotors 227 move horizontally in step with one another, and their vibratory impulse is thus additive. Thereby, a large net alternating force is developed in a horizontal direction, longitudinally of the housing. The gear train as described may be driven from one source of power, but is here shown as having two parallel input shafts 234 and 235, one above the other, driven through flexible couplings 236 from two electric motors 237 and 238. The drive shafts 234 and 235 will be seen to project from opposite sides of the generator housing, and the two motors 237 and 238 are thus mounted on opposite sides of the generator housing, in alignment with the shafts 234 and 235. As here shown, these motors are mounted on frame structures 239 and 240 respectively, erected from the sled 173. The drive shaft 234 carries a gear 242 which meshes with a gear 243 on one of the shafts 225, which is extended somewhat in length to accommodate the gear, as clearly shown in FIG. 17. This particular shaft 225 thus drives the entire upper level gear train and, through the idler gears 230 and 231, would drive also the lower gear train if the latter were not provided with a separate source of power. Drive shaft 234 is shown in FIG. 17 to be extended across the chamber 222 and to be supported in suitable bearings in both wall members 220 and 221 of the housing. The lower gear train is driven from drive shaft 235, which extends transversely across lower chamber 223, below shaft 234, and which will be understood to have bearings with walls 220 and 221 like those for the shaft 234. This shaft 235 carries, in vertical alignment with the drive gear 243, a drive gear 247 which meshes with a spur gear 248 on the shaft 225 which is vertically below the shaft 235 driven by the gear 242, as illustrated in FIGS. 16 and 17. Thus the lower gear train is driven through the shaft 235 from the motor 238.

The operation of the system of FIGS. 13–17 should be clear from the foregoing, being generally similar to that described for the embodiment of FIGS. 6–12. The last described embodiment differs from the preceding one primarily only in scale, being designed for relatively large-size pipes. Because of the large scale of the equipment, the ground-engaging sled 173 is provided for the support of the oscillator 180 and the vibratory bar 202 and yoke structure 208. Vibration from the vibration generator or oscillator 180 is isolated from the sled by reason of the nodal point mountings of the vibratory beam 202 on the yoke 208 erected from the sled, and by reason of the flexible couplings in the motor drive shafts. This nodal point mounting of the beam 202 also isolates the vibratory parts from the dozer blade 211 and sling support 212, which comprise the means through which forward bias force is exerted on the system. The acoustic circuit considerations of this embodiment of the invention, including operation at resonance, are the same as for the preceding embodiment.

FIGS. 18–26 show, partly diagrammatically, another embodiment of the system of the invention, designed in this instance for forming of relatively large tunnel bores for considerable horizontal distances through the ground, and lining of such bores with pipe, which is driven and installed in successive sections and finally integrated into a liner in the bore.

Referring to FIGS. 18-26, the driven pipe or tunnel liner is designated generally by numeral 260, and is made up in sections, such as sections 261, adapted to be welded together at a joint therebetween, such as 262 in FIG. 18. The pipe 260 may comprise an outer shell 260a, and an inner reinforcing structure 260b, of any desired material. The only basic requirement is that the structures be of elastic material, capable of sustaining and transmitting elastic waves or vibrations. This pipe 260 has a front or leading driver section 263 which may, as here shown, be somewhat longer than the sections 261 in order to accommodate certain equipment therein more satisfactorily. The front section 263 is shown in FIG. 18 to be welded to the first section 261, as at joint 264. FIG. 19 continues toward the right from the right-hand end of FIG. 18, and it will be seen that the pipe or liner 260 has been driven into, or has formed, a horizontal bore 268 in the earth. A vertical shaft or well 270 extends downwardly from ground surface to the bore 268, as shown in FIG. 27, and a number of such shafts or bores 270, 270a, etc., are provided, at suitable horizontal intervals, and permit pipe sections 261 to be lowered from ground surface and to be incorporated in the pipe or liner 260, as will be more particularly described hereinafter.

As represented in FIGS. 24–26, the horizontal bore 268 is started into a more or less vertical earth bank 280, the ground surface 281 for some distance ahead of the bank 280 being established at approximately the lower side of the bore 268 to be driven.

As in earlier embodiments of the invention, the pipe or liner 260 is vibrated for the most part elastically, and forced forwardly by a suitably applied biasing force, by means presently to be described, causing the forward end or edge of the head pipe section 263 to penetrate horizontally into the ground. In this case, the pipe 260 is driven open-ended, in view of the contemplated large scale of the apparatus, and to remove the earthen material cut away by the forward end portion of the pipe, or severed by the pipe from the remainder of the soil, the present equipment preferably employs, within the front pipe section 263, a hydraulic washing equipment comprised of hydraulic jets 284 projecting from a ring manifold 285 welded inside the forward end portion of the head pipe section 263. Water under pressure supplied to jets or jet nozzles 284 is directed against the confronting formation wall 286, as clearly shown in FIG. 18, and the soil is thus washed loose, to fall as indicated at 287. This material 287 falls on a guide plate 288 which is mounted in the head end of front pipe section 263, at the bottom thereof, and which leads to a conveyor belt 289 adapted to remove the material 287 from the head end of the bore to a suitable point of deposit, from whence it may be picked up and transported away as desired.

Near the front end of drive pipe 263, just to the rear of manifold 285, is a bulkhead 290, which extends downwardly from the top of the pipe section to a point somewhat below the middle thereof, and this bulkhead 290 forms the front wall of a water tank 292 which extends to the rearward end of the pipe section 263. This tank 292 has rearward walls 294, and side walls 295. A port 296 in bulkhead 290 allows collected water to enter into the tank, and a port 297 in rearward wall 294 allows the water in the tank to reach a compartment 299 feeding the intake pipes 300 of water pumps 302. Said pumps 302 supply water under pressure via pipes 303 to manifold 285. Below and just in back of bulkhead 290 is a lower bulkhead 304 (FIGS. 18 and 23) containing an aperture 305 which receives a swing door 306. This door 306 is pivotally mounted at the top, as at 307, and swings inwardly to pass the material 287 washed down from the bank 286, such material going onto belt conveyor 289, as indicated. A shallow tank 308 is mounted at the bottom of pipe section 263 to collect water draining from the material 287 going onto the conveyor, and this water is lifted via a pipe 309 to the compartment 299 feeding the pumps 302.

Rearwardly in the pipe line from the forward or drive section 263, and clamped thereto, by clamping means later to be described, is a vibration generator transport vehicle or vehicle train 320. In the embodiment here shown, this vehicle 320 comprises a front component 322 and a rear component 324, articulated in a manner to be presently described, such that the front component 322 can be steered to a degree, up or down, and laterally, by the rearward component 324, the purpose being to afford a capability for modifying the direction of the tunnel bore. A crawler vehicle 325 at the rear, provided with crawlers 326, and with a drive means, such as the electric motor 328 diagrammatically represented at 328 in FIG. 24, is pivotally connected at its forward end on a horizontal pivot axis, as at 330, to the rearward component 324 of the generator transporting vehicle. The crawler vehicle 325 need not be detailed; suffice to say that the drive motor 328 is connected with the crawlers 326 by way of any suitable transmission means, with suitable reversing gear such that the vehicle may be driven ahead, or in reverse. The crawlers 326 travel, in the example here given, on planking 334 placed on step formations 335 constructed in the pipe sections near the bottom thereof, one on either side, as shown clearly in cross-section in FIG. 22.

The rearward generator vehicle component 324 has a frame 337 comprised of two side frames 338, a transverse I-beam 339, and any additional bracing as may be required. The frame 337 is vertically supported at its rearward end at 330 on the forward end of the crawler vehicle, utilizing for this purpose a transverse connecting shaft 340, and is vertically supported at its forward end by means of wheels 342 which engage the aforementioned planking 334. The forward end portions of the side frames 338 support an axle 345 for the wheels 342, and directly thereabove support a transverse frame crosstube 346.

Figure 22:
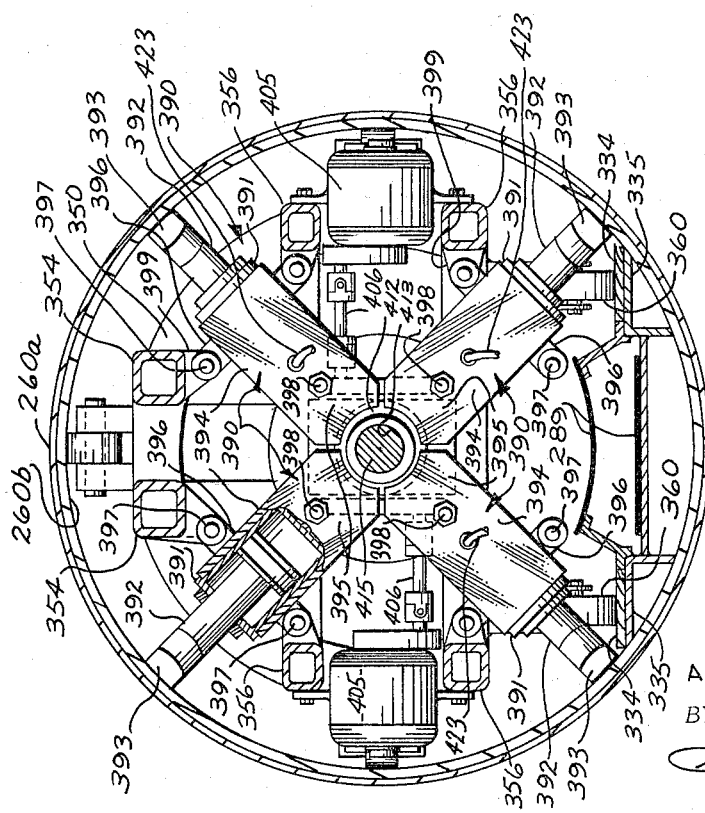
FIG. 22 is a transverse section taken on line 22—22 of FIG. 19.

The front component 322 has a frame 349 composed of generally arcuate front and rear transverse frame parts 350 and 352, connected by spaced longitudinal top members 354, and pairs of spaced side members 356 (see FIG. 22). The front and rear frame parts 350 and 352 each carry top wheels or rollers 358 and side wheels or rollers 359 for rolling engagement with the insides of the pipe 260, and the front frame part 350 carries also wheels 360 for engagement with planking 334 on step formations 335.

The rearward component 324 exerts tractive effort on front component 322 through means as follows. A three-armed bell crank 364 is pivotally mounted at 365 on a transverse frame member 366 of the component 324. The middle arm 367 of the bell crank is connected to the piston rods 368 of a pair of hydraulic cylinders 369. The bell crank 364 may then be powerfully swung on the vertical pivot 365. The bell crank arms 370 have ball-and-socket-joint couplings 371 to a pair of links or push rods 372 which are parallel to one another and extend forwardly longitudinally of the vehicle. The forward end portions of said push rods 372 have ball-and-socket-joint couplings 374 to a pair of bracket arms 375 which project rearwardly from the rearward frame member 352 of the forward vehicle component 322. These bracket arms 375 serve as the means through which forward thrust is exerted on the forward component 322. They are spaced transversely of the vehicle component 322, and are located over the cross-frame tube 346 of vehicle component 324.

Figure 21:
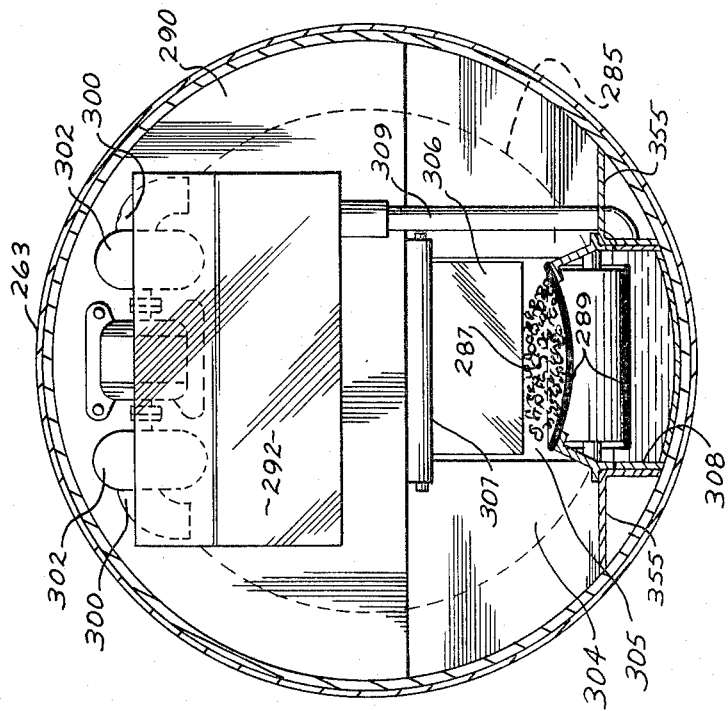
FIG. 21 is a plan view of the apparatus seen in FIG. 19, the upper half of the conduit being removed.

Projecting rearwardly from frame part 352 of forward vehicle component 322, between bracket arms 375, is a horn structure 378, and in this instance this horn structure is in two parts, as seen best in FIG. 21, with an intervening coupling structure 379 between the rearward extremities thereof. To this coupling structure 379 is pivotally connected, as at 380, the upper end of the piston rod 381 of a vertically disposed hydraulic cylinder 382 seated on vehicle component 324, and here shown as vertically supported by I-beam 339. The two members of the horn structure 378 are also formed with horizontal slots 384 which pass the cross-tube 346, and which closely confine the latter, but permit relative lateral swinging action of the horn structure relative to the cross-tube, while permitting the horn structure to remain supported by said cross-tube. It will be seen that by this structure, the rearward extremity of the horn structure may be elevated relative to the vehicle component 324 by means of hydraulic cylinder 382, causing a downward tilt of vehicle component 322 relative to the component 324 about the cross-frame tube 346 of the latter. Also, the vehicle component 322 may be swung laterally in either direction through a limited angle by operation of the hydraulic cylinders 369, as earlier indicated. A useful degree of control on the direction of tunneling is thereby attained, it being evident that a thrust either vertically or laterally exerted on the vehicle component 322, will tend toward accomplishing a corresponding drift of direction of the driven pipe sections ahead.

The vehicle component 324 has thus been described as supported at its front end by the wheels 342, and at its rearward end by the front of the crawler vehicle 325. Additionally, it may be provided at the sides with wheels or rollers 386 adapted for rolling engagement with the interior of the pipe line.

Returning to a further consideration of the vehicle component 322, a clamping means 390 is provided by which the frame of the vehicle component 322 is clamped and thereby acoustically coupled to a surrounding section of pipe 261. To this end, and with particular reference to FIGS. 19 and 22, I provide four hydraulic jack cylinders 391 oriented on two crossing 45° axes (FIG. 22), and projecting outwardly from the pistons therein are piston rods 392 bearing pipe-engaging clamp shoes 393. The cylinders 391 are embraced and clamped by pairs of heavy interiorly cylindrical frames 394, each of which has an inward flat-plate extension portion or slab 395. The frames 394 have ears 396 receiving clamp bolts 397, and the slabs 395 are connected and drawn toward one another by clamp bolts 398. The ears 396 are also connected by the bolts 397 to brackets 399 formed on the frame members 354 and 356, as shown best in FIG. 22. Clamped rigidly between the slab members 395, in the manner clearly shown in FIGS. 19 and 22, is the housing 400 of a vibration generator 401, only diagrammatically shown, but which is of the unbalanced rotor type, described hereinabove. In FIG. 19, two unbalanced rotors 404 are represented, and these are understood as geared to turn in opposite directions, with the unbalanced weights or masses thereof moving horizontally in step with one another, and vertically in opposition, so as to generate an alternating force in a horizontal direction, which is transmitted from the housing 400 to presently described parts coupled thereto. It will be understood that the generator may have multiple rotors for large output, all, of course, properly phased, as in embodiments described hereinabove. To drive this generator, two electric motors 405 are here shown, bolted to opposite sides of the vehicle frame, and have drive shafts 406, containing suitable flexible couplings or universal joints, which are to be understood as connected and geared to drive the unbalanced rotors of the vibration generator.

The generator housing is embraced by two opposed clamp members or fittings 410, which are formed with frusto-conical extensions or hubs 312 embraced, in turn, by complementary clamp faces on the inner ends of the slabs 395. When the bolts 398 are drawn up, the generator housing will be seen to be thereby rigidly clamped to the hydraulic cylinders 391. When hydraulic fluid under pressure is admitted to these cylinders, the piston rods 392 are extended, and the clamp shoes 393 forced outwardly into clamping engagement with the pipe section 261.

The frusto-conical extensions 412 are formed with bores 413 to receive stems 415 projecting from pistons 416 in air cylinders 418. Pistons 416 have stems 420 projecting oppositely from the stems 415, and these stems 420 are axially guided in guide bushings 421 formed centrally in the closed ends of the cylinders 418, as clearly illustrated in FIG. 19. The bored hubs 412 and the guide bushings 421 are made robust so as to preserve alignment of the air pistons. Air under pressure may be admitted to the chambers 422 between the pistons 416 and the outer ends of the air cylinders via pneumatic lines 423 leading from any suitable source of air under regulated pressure, not shown. The bodies of compressed air in chambers 422 function as elastic springs, or, in acoustic terms, as compliances, affording a compliance reactance which counteracts the mass reactance of the generator housing, clamp parts, hydraulic cylinders, etc., which must be shaken by the vibration generator 401.

Fixed to the front frame member 350 of vehicle component 322 is a stem 430 carrying a piston 431 which works in an air spring cylinder 432, the latter containing a chamber 433 filled with air under compression via an air supply hose 434. This air spring cylinder 432 is coupled to a transverse beam 435, whose extremities are adapted to bear against abutment brackets 436 (FIG. 21) welded to the interior of the pipe section in which the vehicle component 322 is to work.

It will be understood that, in operation, a forward thrust is exerted from the powered crawler vehicle 325 to the frame of the vehicle component 324, thence through push rods 372 to the frame 349 of vehicle component 322, and from there through air spring cylinder 432 and the body of air compressed therewithin to the beam 435, and thence against the brackets 436 welded to the inside of the pipe line which is to be driven. Thus, by this means, a continuous forward biasing force is exerted against the pipe to be driven. The rearward air cylinder and piston combination 418, 416 also functions to afford bias force application from the vehicle frame 349 to the generator and thence, through the clamps, to the pipe. The cylinders and pistons 418, 416 also substantially isolate the vehicle frame 349 from the generator.

The vibration generator 401, being clamped to the surrounding pipe section 261 by the clamp means described hereinabove, the vibratory output force from the vibration generator is exerted through the slabs 395 and the clamp means so as to act longitudinally against the pipe section 261. Also, in accordance with the theory of the invention as discussed hereinabove, the vibration frequency of the vibration generator 401 is made such that the compliance and mass reactances of the vibratory system tend to equalize and cancel one another, so that the output force from the vibration generator is not consumed vibrating the housing and clamp parts, but conserved for application to the pipe to be driven. The structure which must be vibrated obviously has considerable mass. Elastic compliance is provided by the compressed air bodies in cylinders 418, by the generator mounting slabs 395, clamp shafts 392, and the pipe itself. The basic acoustic circuit considerations are similar to those of the systems of FIGS. 1–3, 6–12, and 13–17.

The tunnel driving system under consideration may now be further described, reference being had initially to FIGS. 24–29.

Referring first to FIG. 24, the apparatus is shown with a pipe consisting of welded-together sections 263 and 261 driven into a position substantially flush with the initial earth bank 280, the vehicle running on planking 334 mounted on step formations inside the pipe, as described earlier, and on blocks such as at 437 resting on ground surface 281, approaching the bank and the tunnel area.

It will be understood that the tunnel pipe or liner is driven forward into the earth by a vibratory system of the same general nature as described in the earlier embodiments of the invention. Thus, forward pressure is exerted on the pipe, generated by the crawler vehicle 325 in reactive engagement with the planking 334, or with the ground, which amounts to the same thing, and the welded-together pipe sections 263 and 261 being set into longitudinal elastic vibration derived from the vibration generator 401, in the manner earlier indicated. The pipe 260 is thereby driven into the earth in the manner earlier described, with the addition, however, that in this case, the confronting earth bank 286 (FIG. 18) inside the forward end portion of the pipe 260 is constantly being impinged upon and thus washed away by the hydraulic jets from the nozzles 284.

The equipment having reached such a position as illustrated diagrammatically in FIG. 24, the articulated vehicle "train" 322, 324 and 325 is unclamped from the pipe section 261, retracted, as to the position shown in FIG. 25, and a further pipe section 261 is lowered into position in alignment with the already driven pipe sections 263 and 261. FIG. 25 shows the new pipe section 261 being lowered, and it will be understood that the new pipe section 261 will be abutted against the preceding and previously driven pipe section 261, and then welded securely thereto, and the illustrated earth conveyor will be repositioned inside the newly added section 261. Thereafter, the vehicle train 322, 324 and 325 is moved forwardly and into the new section 261, engaged therewith and clamped thereto, and the pipe, with this new section 261 added, then driven ahead by the sonic vibration drive process of the invention. It will be seen that this procedure may be repeated a number of times, until a long length of pipe 260 has been thus driven into the earth.

FIG. 26 shows a subsequent position, the forward pipe section 263 having now been driven past the first well or shaft 270, and the pipe section 261 immediately in back of the front section 263 being now wholly within said shaft 270. The vehicle train is disengaged from driving engagement with the pipe, and then backed up, as to the position indicated. The pipe 260 is now cut, as by a welding torch, at the rearward end of the pipe section 261 located inside the shaft 270, as at line or plane 438.

The vehicle train is then driven forward and engaged with and clamped to the pipe section 261 thus cut free at line or plane 438. This pipe section 261 and the front or head section 263 ahead of it are then driven forward by the sonic driving process of the invention, as to position shown in FIG. 27, such that the section 261 cut free at plane 438 has been moved across the well or shaft 270. The vehicle train is then backed up across the well 270, so as to leave an unobstructed gap between the pipe section 261 which has been driven across shaft 270, and the immediately succeeding pipe section 261 which terminates at the beginning side of the shaft 270, i.e. at plane 438. A new pipe section 261 is then lowered into this gap, and its forward end welded to the rearward end of the pipe section 261 which has been driven across the gap. Thereafter, the vehicle train is again advanced, engaged with and clamped to the newly added pipe section 261, and the pipe line then driven ahead, so as to again open a gap within the well or shaft 270, which will thereafter be filled by a further pipe section 261, and so on.

Thus, with the pipe in back of the first well 270 remaining in position, a long length of pipe may thus be driven forward from the first well 270 by adding succeeding pipe sections 261. At 270a is indicated a further well for adding additional pipe sections, and it will be understood that this well 270a is placed at either a convenient location in the topography, or at a location where it is becoming difficult to drive the pipe for additional distance. This procedure may be repeated until a long length of pipe has been installed. At the end, the gaps in the pipe at the shafts 270 are filled in with final pipe sections 261, and these are then welded in place to complete the conduit. As an alternative, for subways, etc., these gaps may be the station points of a transit system.

Reference is next directed to FIGS. 28 and 29 showing, diagrammatically, one additional illustrative form of the invention. The purpose in this instance is, as in the immediately preceding embodiment, to provide a horizontal bore or tunnel of long length and of some considerable diameter. The advantage here over the preceding embodiment resides in elimination of the necessity for the use of the wells or shafts leading downward from the ground surface at intervals through which to add additional segments of pipe. In this case, a forward or leading elastic drive pipe is utilized, and is forced ahead by sonic vibration and forward bias pressure as in the preceding embodiment. However, instead of adding successive sections or segments of rigid pipe as the operation proceeds, a flexible liner pipe, such as of corrugated metal, is hooked to the rearward end of the drive pipe, and this pipe can be merely dragged along through the bore made by the head pipe, without having to participate in the sonic vibration. As the hole is made deeper, additional segments of this flexible pipe can be added, in each case being simply hooked on to the rearward end of the flexible pipe already in use.

The system will be understood from a consideration of FIGS. 28 and 29, to which reference is now made. Numeral 450 designates the main or head pipe, which is sonically vibrated and simultaneously urged forwardly in order to penetrate the soil. In FIG. 28, the ground surface is indicated at 451, and is shown as sloping to a vertically cut face 452, below which is a relatively level ground surface area 453 over which the equipment may be led on its way into the earth. Connected to the rearward end of drive pipe 450 is a flexible, tunnel liner conduit 454, made for example, of corrugated metal. This conduit 454 may have sections added to it as the tunnel deepens. They may be brought up from the rear, open at the bottom, and folded or bent in somewhat to go around the equipment already inside the tunnel. They may then be arranged around and under this equipment, and connected, as by welding, to the pipe section just ahead. Joints between such sections are represented at 454a in FIG. 28. As in the preceding embodiment, the soil confronting the open end of the pipe 450 is continuously washed away by means of hydraulic jets from nozzles 455 projecting from a ring-shaped manifold 456. The mounting of this manifold and its supply of water under pressure will be referred to hereinafter. The drive pipe 450 is, for example, an elastic steel pipe fabricated in any desired manner and capable of withstanding a substantial degree of longitudinal elastic vibration.

Longitudinal elastic vibrations are set up in the pipe 450 through heavy transverse steel beams 460, which extend diametrically across the pipe 450 towards the rearward end of the latter and are rigidly connected at their outer ends to the rearward end portion of the pipe 450, and which are preferably somewhat elastic, or capable of elastic deformation vibration in directions longitudinally of the pipe. As indicated, there are two of the beams 460, spaced longitudinally of pipe 450, and laterally of one another, and between these two beams 460 and rigidly connected thereto is the housing of a vibration generator or isolator designated generally at 462. This generator 462 is only diagrammatically shown in FIG. 28, but will be understood to be preferably of the character already described in several forms hereinabove, and adapted to generate an alternating force along the longitudinal axis of the pipe 450. This force is applied directly to the central portions of the transverse beams 460, and through the beams 460 to the pipe 450. In a preferred form, the beams 460 may be elastic, so as to constitute an acoustic compliance. Any suitable drive means may be provided for the vibration generator 462, not shown, and it will be understood that the vibration generator 462 is driven at a frequency such as to set up a condition of resonance in the vibratory system comprising the acoustic circuit of the apparatus.

Contained within the pipe member 450 and disposed about the vibration generator 462 is a framework comprised of longitudinal members 470, upper and lower, and transverse members 471 and 472, the latter being rearwardly and forwardly of the bars 460, respectively. These frame members support air cylinders 474 and 475, located rearwardly and forwardly of the members 460, respectively. Each of the members 460 has rigidly connected therewith a piston rod 476 which carries a piston 477 in the respective air cylinder 474 or 475, as the case may be, and piston rods 476 project beyond the pistons 477 through suitable guide bores in the walls of the air cylinders and in the frame members 471 and 472, as clearly illustrated.

Air under controlled pressure is admitted to the chambers of the two air cylinders through air lines such as indicated at 479, and these air lines 479 are supplied with air under pressure from an air pressure reservoir 480 mounted on a subsequently mentioned crawler vehicle which follows the drive pipe 450. The longitudinal frame members 470 support at their forward ends a bulkhead 482 which is connected to and fills the space inside the ring manifold 456. Projecting rearwardly from the transverse frame member 471 is a rearwardly tapering wedge-like frame 485, whose rearward extremity is supported, as presently described, on the top frame portion 487 of a forward crawler vehicle generally designated at 488. The upper frame part 487 abuts a frame part 489 connected to the wedge frame 485, and forward thrust is transferred from crawler vehicle 488 to the wedge frame 485 and parts in front of the latter by the abutting engagement of the members 485 and 489, as represented in FIG. 28.

Behind crawler vehicle 488 is a generally similar crawler vehicle 490, having a frame part 491 generally similar to the frame part 487 of crawler vehicle 488, and these frame parts are in abutting engagement, as seen in the drawing, for transmission of forward thrust of the crawler vehicle 490 to the crawler vehicle 488.

Coupled to crawler vehicle 490, as at 492, is a trailing tank vehicle 494, and the latter has at the rear a conveyor 495 for elevating solids from the bottom of tank 496 and dumping them into, for example, a small cart such as represented at 497, which may be removed and dumped from time to time. A pipe line 497a leads from a pump 498 taking liquid from the upper end of tank vehicle 494 and discharges into manifold 456, and a return pipe 499 picks up liquid and earth washings from the soil and discharges them into tank vehicle 494. Any suitable means may be employed for inducing flow of material through return pipe 499. For example, a pump may be employed, or an air injector might be used, the latter opening with a rearward direction of velocity into the front end portion of the pipe 499, and being served by means of air under pressure, for example, from compressed air tank 480, shown as located on the crawler vehicle 490. Such provisions are simple and will be understood by those skilled in the art without the necessity of additional illustration herein.

Provision has been made whereby the drive pipe 450 may be steered, to a degree, from the forward crawler vehicle 488, and the steering may be either laterally or vertically. As shown in FIG. 28, the frame member 485 is provided top and bottom with hydraulic jacks 500, and the piston rods of these jacks carry shoes 501 which are engageable, at the top, with the pipe 454 lining the tunnel, and at the bottom, with flooring means provided for the tractor vehicles 488 and 490. Illustratively, such flooring means may comprise girders such 502 brought forward from the rear and laid in place as the crawler vehicles progress into the tunnel. It will be clear that by adjustment of the admission of hydraulic fluid to these hydraulic jacks 500, the frame member or extension 485, and the framing members caging the oscillator 462 and connected to the beams 460 which are fast with the drive pipe 450 will cause the latter to be tilted either up or down through a small angle, as desired. The tail end or extremity of frame member 485 may rest on the upper frame member 487 of the crawler vehicle 488, and to accommodate such tilting action, a connection between the two is preferably made, here indicated in the form of a headed pin 505, with a coil compression spring 506 used between the head of said pin and the extremity of member 485.

In addition to the upper and lower hydraulic jacks 500, the wedge-frame 485 is equipped at each of its sides with a similar hydraulic jack, indicated here at 508, and having at the outer end of its piston rod a shoe 509 which is engageable with the side of the corrugated pipe 454. Since the pin 505 provides a vertical-axis coupling between the frame member 485 and tractor vehicle 488, operation of the hydraulic jacks 508 is capable of imparting a lateral directional adjustment to the drive pipe 450.

The operation of the system of FIGS. 28 and 29 should now be clear. Drive pipe 450 is sonically vibrated, and afforded with forward bias thrust from crawler vehicles 488 and 490 in a manner analogous to that heretofore described in connection with the earlier embodiments of the invention, and is so induced to work ahead in the soil. This action is aided by the washing away of the soil area confronting the bulkhead 482 by the hydraulic jetting action described. As the drive pipe 450 moves forwardly, it drags the flexible, corrugated pipe liner 454 after it. This it can do without consumption of large power, since the flexible pipe 454 has only loose engagement with the tunnel formed by the drive pipe 450. Moreover, there is a certain amount of sonic energy transmitted back along the following pipe, which aids its mobility in the hole. It will be understood that the flexible pipe 454 will under ordinary circumstances be intended as a temporary liner only, and that the tunnel may be subsequently lined in any manner desired.

The acoustic circuit considerations of the system of FIGS. 28 and 29 are similar to those described for the earlier embodiments of the invention. In addition, however, the relatively extended transverse coupling bars 460 are somewhat elastically deformable laterally (in directions longitudinally of the pipe) in the operation of the system and thereby contribute to the system a proportion of the over-all compliance reactance that is desired to counteract and tune out mass reactance at the operating frequency and thus bring about desirable over-all resonant behavior. These compliant bars 460 also improve or increase the compliance reactance of the system, and thus function as Q-boosters.

The two air springs constituted by the air cylinders 474 and 475 and pistons 477 act to isolate the generator 462 from the frame 450. The rearward air cylinder 474 and piston 477 also function to transmit bias force applications from the vehicle train through the bars 460 to the pipe 450.

It will be understood without further illustration how the system of the invention can be utilized to replace a worn pipe or conduit simply by driving a new one inside the old and worn one. The inside of the old pipe in such case replaces the soil through which the pipe is driven in the first described application of the invention, and contributes a frictional resistance to driving of the pipe which is overcome by the vibratory drive effort characteristic of the broad invention.

In observing the driving of pipe through soil by vibratory methods, I have observed some phenomena of great interest and importance that occur only when a resonant acoustic apparatus is employed, by which I mean either a sonically vibrating pipe which is resonant in and of itself, or a resonant sonically vibratory apparatus where the pipe itself may not be resonant, but functions more or less as a unitary bodily vibrating "lump" which is acoustically coupled in a resonant circuit or sonically vibratory system, which circuit or system must include some elastically vibratory device to furnish necessary compliance reactance for balancing out the mass reactance of the system. With apparatus of such resonance characteristics, the soil offers resistance to penetration by the pile, and the pile is resistively coupled thereto. However, the soil does not in these cases become or function as a par of the resonant circuit. The resonant phenomena proceed independently of the soil, and, in fact, the pile is reactively decoupled from the soil. The very advantageous consequence is that sonic vibration is not transmitted to any large extent into and through the soil. The ground is not materially vibrated outward from the pipe.

With an older pipe driving system, a different performance is observed. According to this older system, the pipe is bodily vibrated, in absence of a resonant driving system, and the soil itself supplies springiness, or more technically, compliance reactance, to achieve a kind of bouncing response. Such a system is capable of driving pipe, though not nearly so effectively as that of the invention; but it is noteworthy and of extreme interest that with this system, vibrations of strong amplitude are transmitted into and for long distances through the soil, to obvious disadvantage. The pipe is then both resistively and reactively coupled to the soil, the latter being a condition of vibration transmission. It thus appears that when a bodily vibration device is brought into engagement with the earth the earth tries to function as a spring to bring about a form of bodily vibration response and thereby handle the bouncing inertia of the pipe mass. This leads to ground vibration of large amplitude which is propagated for great distance.

With the present driving system, on the other hand, all of the necessary compliance reactance of the circuit is met by the resonant function of the pipe itself, or of the pipe plus the sonic driving system. Therefore the earth is only a resistive impedance. Under these conditions then the earth can vibrate in a more or less random manner, with the individual grains moving substantially and in random directions relative to each other. I believe this is the reason for the rapid fluidization of the soil immediately around the pipe. It also explains why the vibrations are transmitted such a very short distance through the soil. Random vibrations of course die out very quickly. By random vibrations I am not referring to random frequency, but rather to random relative motion between the individual grains, particularly as regards amplitude and direction of vibration. All of these functions, on the other hnad, have to be more or less in unison when functioning as a unitary compliance, as above described in connection with a bodily vibration pipe.

The individual grains of soil material in contact with the pipe behave with complete indifference to the existence of reactance in the case wherein the pipe is itself resonant, and also in the case wherein the pipe is a part of or acoustically coupled to a resonant acoustic driving system. In absence of either of these cases, however, and assuming the prior art case of bodily bouncing vibration, without resonance in the driving system, a natural tendency of compliance reaction response cooperating with the bodily vibration occurs by movement of a fairly large volume of soil with the pipe. The granular particles within the fairly large volume of soil around the pipe must move in unison in order to achieve enough compliance reactance for this bodily bouncing type of response to occur. And, as stated above, this involves a large reactance-type coupling of the pipe to the soil, and therefore large propagation of vibration into and through the soil. With resonance supplied by the pipe and/or the acoustic driving circuit, on the contrary, as in this invention, only random vibration of the soil particles tends to occur. The pipe is then virtually reactively decoupled from the soil. Vibration attenuation is large, and there is no large and widely propagated vibration of the soil. Moreover, the soil fluidizes readily and the pipe rapidly penetrates the soil.

In some cases, particularly with light pipe, it is highly advantageous to improve the Q of the system by using a resonant acoustic pipe driving circuit which includes a Q-booster member having a large compliance reactance. This reactance can be supplied within or in connection with the isolator. However, it is often desirable to add to the circuit an additional elastically vibratory Q-booster member of large compliance reactance.

The invention has been disclosed primarily as a system for driving pipe horizontally through the soil, but in some aspects, vertical driving is within the scope of the invention. In vertical driving, of course, the unidirectional force exerting means and reactive mass may be replaced by a bias weight exerting downward force on the pipe, for example, through the isolator; or parts resting upon the isolator may be sufficiently massive to exert the necessary downward force, which is the equivalent. Of course, in some applications and/or forms of the apparatus, the isolator can be omitted, though it is generally preferred and is always an advantage.

A substantial number of illustrative applications of the invention have now been disclosed. It will be understood that these are for illustrative purposes only, that details thereof, excepting where otherwise noted, are not essential to practice of the broad invention, and that various changes in design structures and arrangement may be made therein without departing from the spirit and scope of the broad invention, or of the broader of the appended claims.

I claim:

1. A system for driving a conduit of elastic material generally horizontally into the earth that comprises:
    a vibration generator including means for acoustic coupling to said conduit when said conduit is substantially horizontally oriented and directed into endwise engagement with the earth, said generator having a vibration frequency range including a resonant frequency of said conduit;
    a vibration isolation means coupled to transmit force to said conduit;
    a unidirectional-force-exerting means coupled to said vibration isolation means and including means for exerting a unidirectional force through said isolation means for transmission to said conduit in the direction of desired penetration; and
    reaction-receiving means connected to said unidirectional-force-exerting means, said reaction-receiving means including means for reaction engagement with the earth.

2. A system for driving a conduit of elastic material generally horizontally into the earth that comprises:
    a vibration generator including means for acoustic coupling to said conduit when said conduit is substantially horizontally oriented and directed into endwise engagement with the earth, said generator having a vibration frequency range including a resonant frequency of said conduit;
    a vibration isolation means coupled to deliver force to said conduit;
    a unidirectional-force-exerting means coupled to said vibration isolation means and including means for exerting a unidirectional force through said isolation means for transmission to said conduit in the direction of desired penetration; and
    massive reaction-receiving means connected to said unidirectional-force-exerting means.

3. The subject matter of claim 2, wherein said isolation means comprises an air spring.

4. The subject matter of claim 2, wherein said vibration isolation means comprises an elastic bar vibrating in a standing wave mode characterized by nodal and antinodal regions, with said unidirectional-force-exerting means coupled to a nodal region thereof, said generator coupled to an antinodal region thereof, and said conduit coupled to an antinodal region thereof.

5. The subject matter of claim 4, wherein said elastic bar comprises a bar vibrating in a lateral mode, with at least two nodal regions and three antinodal regions, with said unidirectional-force-exerting means coupled to two of said antinodal regions, said conduit coupled to an antinodal region of said bar, and said conduit coupled to an antinodal region of said bar.

6. A system for driving a conduit generally horizontally into the earth that comprises:
    a mandrel of elastic material oriented parallel to said conduit and engageable with said conduit for longitudinally moving said conduit therewith through the earth;
    a vibration generator including means for acoustic coupling to said mandrel when the combination of said mandrel and conduit is substantially horizontally oriented and is directed into endwise engagement with the earth, said generator having a vibration frequency range including a frequency at which said mandrel vibrates under a condition of resonance;
    a vibration isolation means coupled to deliver force to said mandrel and conduit;
    a unidirectional bias force means coupled to said isolation means and including means for exerting a unidirectional force through said isolation means for transmission to said mandrel in the direction of desired penetration; and
    reaction-receiving means connected to said unidirectional-force-exerting means, said reaction-receiving means including means for reaction engagement with the earth.

7. The subject matter of claim 6, wherein said conduit has a cap at its forward end which is engaged by the forward end of said mandrel.

8. The subject matter of claim 6 wherein said mandrel is a tubular member which receives and surrounds said conduit.

9. The subject matter of claim 6 wherein said mandrel is receivable inside said conduit.

10. A system for driving a pipe horizontally into the earth that comprises:
    a vibration generator including means for acoustic coupling to said pipe when said pipe is substantially horizontally oriented and directed into endwise engagement with the earth;
    a vibration isolation means coupled to deliver force to said pipe;
    said pipe, vibration generator and vibration isolation means comprising a sonic vibratory system characterized by mass and elastic elements furnishing counteracting mass and compliance reactances and having a resonant frequency, and said vibration generator having a frequency range including said resonant frequency;
    a unidirectional-force-exerting means coupled to said vibration isolation means and including means for exerting a unidirectional force through said isolation means for transmission to said pipe in the direction of desired penetration; and
    massive reaction-receiving means connected to said unidirectional-force-exerting means.

11. The subject matter of claim 10, wherein said isolation means comprises an air spring.

12. The subject matter of claim 10, wherein said vibration isolation means comprises an elastic bar vibrating in a standing wave mode characterized by nodal and antinodal regions, with said unidirectional-force-exerting means coupled to a nodal region thereof, said generator coupled to an antinodal region thereof, and said conduit coupled to an antinodal region thereof.

13. The subject matter of claim 12, wherein said elastic bar comprises a bar vibrating in a lateral mode, with at least two nodal regions and three antinodal regions, with said unidirectional-force-exerting means coupled to two of said antinodal regions, said conduit coupled to an antinodal region of said bar, and said conduit coupled to an antinodal region of said bar.

14. A system for driving a pipe into the earth that comprises:
- a vibration generator including means for acoustic coupling to said pipe;
- unidirectional bias-force means coupled to said pipe for exerting force thereon in the direction of desired penetration into the earth; and
- a compliant, elastically vibratory Q-booster member acoustically coupled to said vibration generator and vibrated thereby;
- said pipe, vibration generator and Q-booster member comprising a vibratory acoustic circuit characterized by mass and elastic elements furnishing counteracting mass and compliance reactances and having a resonant frequency, and said vibration generator having a frequency range including said resonant frequency.

15. A system for driving a pipe through a previously installed pipe, in frictional engagement therewith, that comprises:
- a vibration generator including means for acoustic coupling to said pipe when said pipe is substantially horizontally oriented and directed into said previously installed pipe;
- a vibration isolation means coupled to deliver force to said pipe to be driven;
- said pipe to be driven, vibration generator and vibration isolation means comprising a sonic vibrating system characterized by mass and elastic elements furnishing counteracting mass and compliance reactances and having a resonant frequency, and said vibration generator having a frequency range including said resonant frequency;
- a unidirectional-force-exerting means coupled to said vibration isolation means and including means for exerting a unidirectional force through said isolation means for transmission to said pipe to be driven in the direction of desired penetration; and
- massive reaction-receiving means connected to said unidirectional-force-exerting means.

16. A system for driving a pipe horizontally into the earth that comprises:
- a vibration generator including means for acoustic coupling to said pipe when said pipe is substantially horizontally oriented and directed into endwise engagement with the earth;
- a vibration isolation means coupled to deliver force to said pipe;
- said pipe, vibration generator and vibration isolation means comprising a sonic vibratory system characterized by mass and elastic elements furnishing counteracting mass and compliance reactances and having a resonant frequency, and said vibration generator having a frequency range including said resonant frequency; and
- a ground supported power vehicle coupled to said isolation means for exerting a unidirectional force through said isolation means for transmission to said pipe in the direction of desired penetration.

17. A system for driving a pipe horizontally into the earth that comprises:
- an elastically laterally vibratory bar extending transversely across the longitudinal axis of the pipe to be driven;
- means including pipe clamping means for coupling the central portion of said bar to said pipe;
- said bar having a lateral mode of standing wave vibration including three spaced antinodal regions and intervening nodal regions;
- a vibration generator coupled to one of said antinodal regions of said bar;
- coupling means coupled to the nodal regions of said bar; and
- a force-exerting, ground-engaging power vehicle connected to said coupling means.

18. A system for driving a pipe into the earth that comprises:
- a supporting frame;
- a vibration generator oriented for delivering an oscillatory output force along a direction line longitudinal of said pipe;
- means including spring means supporting said vibration generator on said frame for vibratory movement relative to said frame along said direction line;
- means for acoustically coupling said generator to said pipe for transmission of vibrations from said generator to said pipe;
- means for applying a bias force to said frame in the direction of desired pipe penetration; and
- spring coupling means between said frame and said pipe for transmission of bias force from said frame to said pipe.

19. A system for driving a pipe into the earth that comprises:
- a supporting frame;
- a vibration generator oriented for delivering an oscillatory output force along a direction line longitudinal of said pipe;
- means supporting said generator in said frame for vibratory movement relative to said frame along said direction line, said means including opposed springs mounted and arranged on said frame and acoustically coupled to said vibration generator for compression and expansion in response to said vibratory movement of said generator;
- means for acoustically coupling said generator to said pipe for transmission of vibrations from said generator to said pipe; and
- means for applying a bias force to said frame in the direction of desired pipe penetration;
- said springs functioning to substantially isolate the vibrations of said generator from said frame, and at least one of said springs functioning to transmit bias force from said frame to said pipe via said generator and the acoustic coupling of the latter with the pipe.

References Cited by the Examiner
UNITED STATES PATENTS

| | | | |
|---|---|---|---|
| 2,975,846 | 3/1961 | Bodine | 175—19 |
| 3,038,546 | 6/1962 | Blumbaugh et al. | 175—162 X |
| 3,106,258 | 10/1963 | Muller | 175—162 X |
| 3,107,741 | 10/1963 | Adams et al. | 175—62 X |
| 3,187,513 | 6/1965 | Guild | 175—19 X |

CHARLES E. O'CONNELL, *Primary Examiner.*

R. E. FAVREAU, *Assistant Examiner.*

UNITED STATES PATENT OFFICE
CERTIFICATE OF CORRECTION

Patent No. 3,283,833                          November 8, 1966

Albert G. Bodine, Jr.

It is hereby certified that error appears in the above numbered patent requiring correction and that the said Letters Patent should read as corrected below.

Column 30, line 12, for "antinodal" read -- nodal --; same line 12, for "conduit" read -- generator --; column 31, line 7, for "antinodal" read -- nodal --; same line 7, for "conduit" read -- generator --.

Signed and sealed this 12th day of September 1967.

(SEAL)
Attest:

ERNEST W. SWIDER                                EDWARD J. BRENNER
Attesting Officer                                     Commissioner of Patents